United States Patent
Song et al.

(10) Patent No.: US 11,323,612 B2
(45) Date of Patent: May 3, 2022

(54) DISPLAY APPARATUS AND METHOD OF CONTROLLING THE SAME

(71) Applicant: Samsung Electronics Co., Ltd., Suwon-si (KR)

(72) Inventors: Hyuna Song, Suwon-si (KR); Dongwook Kim, Suwon-si (KR); Jungseop Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/139,265

(22) Filed: Dec. 31, 2020

(65) Prior Publication Data
US 2021/0211574 A1 Jul. 8, 2021

(30) Foreign Application Priority Data
Jan. 2, 2020 (KR) .................. 10-2020-0000309

(51) Int. Cl.
*H04N 9/47* (2006.01)
*H04N 5/232* (2006.01)
(Continued)

(52) U.S. Cl.
CPC ......... *H04N 5/23219* (2013.01); *G06V 40/10* (2022.01); *H04N 5/23216* (2013.01);
(Continued)

(58) Field of Classification Search
CPC .. H04N 9/47; H04N 5/23219; H04N 5/23299; H04N 5/23216; H04N 5/23245;
(Continued)

(56) References Cited

U.S. PATENT DOCUMENTS 7,471,888 B2 * 12/2008 Maeda ................ H04N 5/2252
348/E5.025
8,665,304 B2 * 3/2014 Yu ........................ H04N 13/371
709/204
(Continued)

FOREIGN PATENT DOCUMENTS

KR   10-1999-0084509   12/1999
KR   10-2007-0058998    6/2007
(Continued)

OTHER PUBLICATIONS

PCT International Search Report dated May 3, 2021 in International Application No. PCT/KR2020/019310.

*Primary Examiner* — Trang U Tran
(74) *Attorney, Agent, or Firm* — Staas & Halsey LLP

(57) ABSTRACT

A display apparatus of the disclosure includes a reflection module; a camera configured to capture a first image in a first position located at the rear of the reflection module and capture a second image in a second position exposed to the outside of the display apparatus; a driver configured to move at least one of the camera and the reflection module; a controller configured to determine the presence of a user based on the first image captured by the camera in the first position, and to control the driver to move at least one of the camera and the reflection module so that the camera is located in the second position, based on the determination that the user is present; and an inputter configured to receive a user input.

19 Claims, 21 Drawing Sheets

(51) Int. Cl.
*H04N 7/18* (2006.01)
*H04N 5/63* (2006.01)
*G06V 40/10* (2022.01)
*G06V 40/20* (2022.01)

(52) U.S. Cl.
CPC ..... *H04N 5/23245* (2013.01); *H04N 5/23299* (2018.08); *H04N 5/63* (2013.01); *H04N 7/188* (2013.01); *G06V 40/20* (2022.01)

(58) Field of Classification Search
CPC .......... H04N 5/63; H04N 7/188; G06V 40/10; G06V 40/20
USPC .......................................................... 348/77
See application file for complete search history.

(56) References Cited

U.S. PATENT DOCUMENTS

| | | | |
|---|---|---|---|
| 8,823,769 B2 * | 9/2014 | Sekine | H04N 7/15 348/14.16 |
| 8,872,882 B2 * | 10/2014 | Shanmukhadas | H04N 19/40 348/14.05 |
| 8,970,663 B2 * | 3/2015 | Gagneraud | H04N 5/23218 348/14.15 |
| 9,124,785 B2 | 9/2015 | Choi et al. | |
| 9,606,617 B2 | 3/2017 | Kim et al. | |
| 10,021,296 B2 * | 7/2018 | Fan | H04N 5/2251 |
| 10,812,698 B1 * | 10/2020 | Zhou | G03B 17/561 |
| 11,150,690 B2 * | 10/2021 | Franke | G06F 1/1607 |
| 2006/0139463 A1 * | 6/2006 | Heinonen | H04N 5/247 348/E5.025 |
| 2007/0159661 A1 | 7/2007 | Kondo | |
| 2014/0092199 A1 | 4/2014 | Kim et al. | |

FOREIGN PATENT DOCUMENTS

KR 10-2008-0052398 6/2008
KR 10-2016-0140297 12/2016

* cited by examiner

FIRST POSITION

SECOND POSITION

THIRD POSITION

FIG. 14
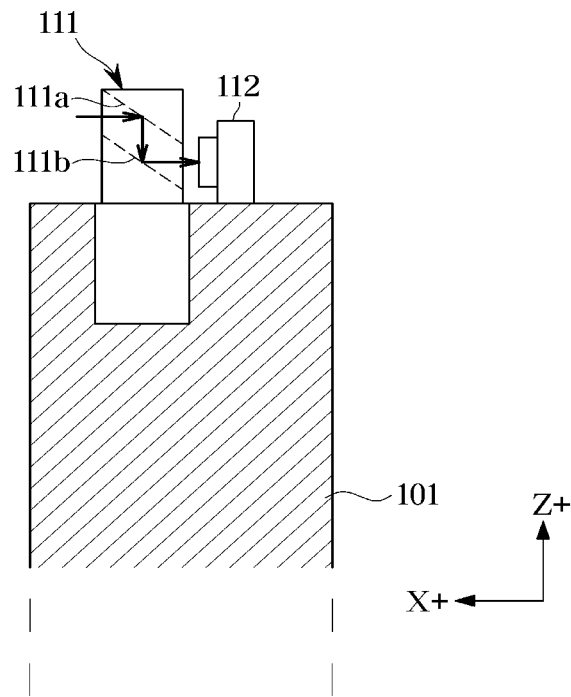
FIRST POSITION
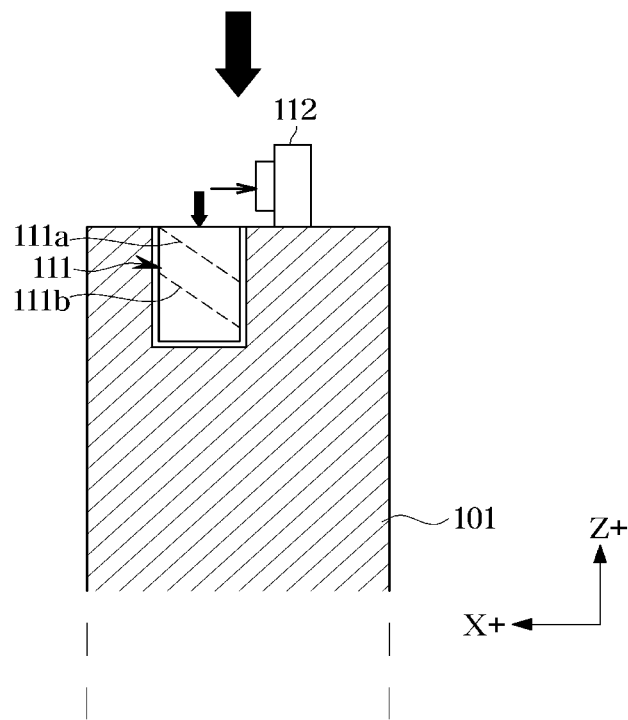
SECOND POSITION

FIG. 15
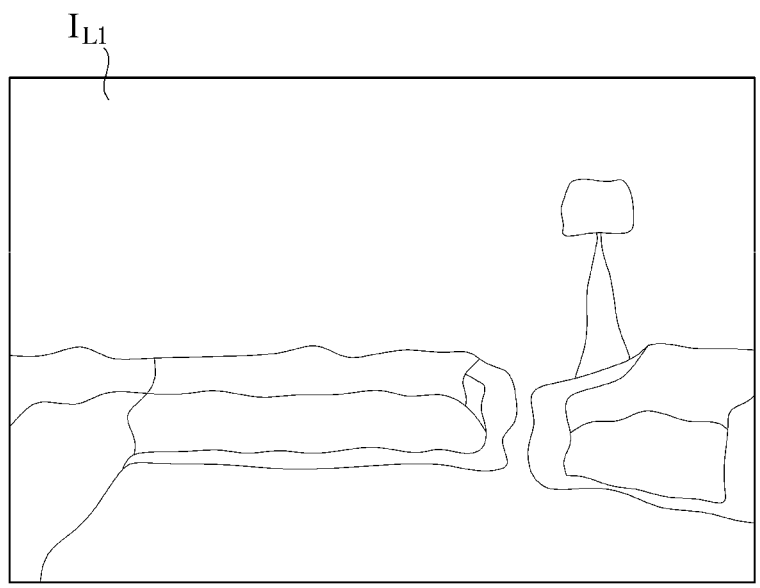
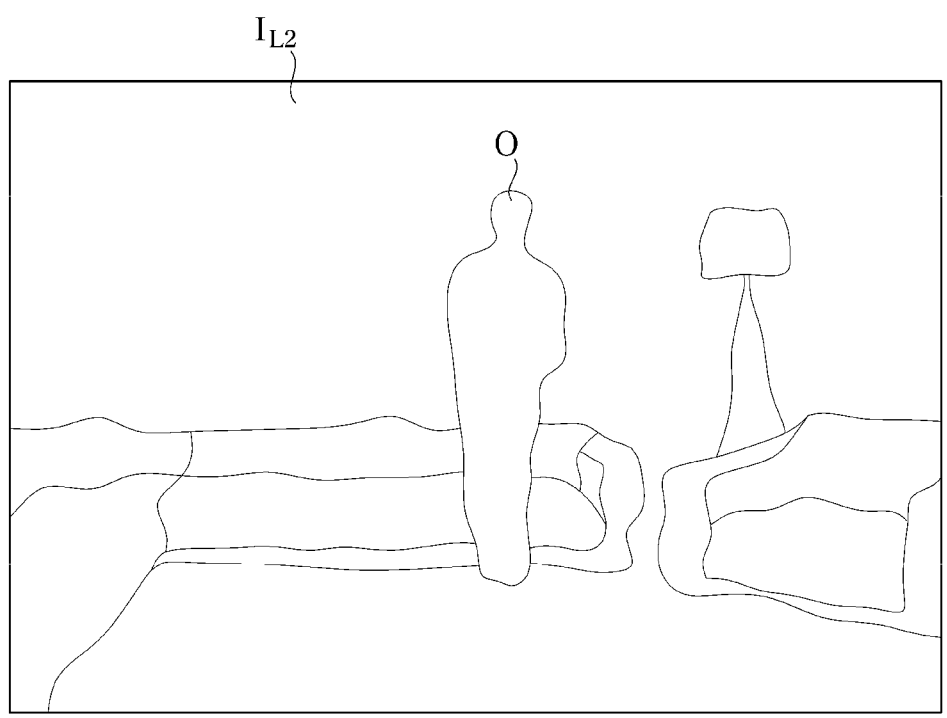

DISPLAY APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0000309, filed on Jan. 2, 2020, the disclosure of which is incorporated herein by reference.

BACKGROUND

1. Field

The disclosure relates to a display apparatus including a camera and a method of controlling the same.

2. Description of Related Art

In addition to a simple image display function, a recent display apparatus may provide various functions using a camera such as gesture recognition, video call, and user detection.

Images captured by the camera mounted on the display apparatus are stored in a memory of the display apparatus, and in some cases, transmitted to an external server or an external device connected to the display apparatus.

Therefore, if the camera mounted on the display apparatus is constantly exposed and capturing an image, a problem of invading a user's privacy may occur, and the user may feel uncomfortable regardless of whether the actual privacy is infringed.

SUMMARY

According to an aspect of the disclosure, there is provided a display apparatus including: a reflection module; a camera configured to capture a first image in a first position located at the rear of the reflection module and capture a second image in a second position exposed to the outside of the display apparatus; a driver configured to move at least one of the camera and the reflection module; a controller configured to determine the presence of a user based on the first image captured by the camera in the first position, and to control the driver to move at least one of the camera and the reflection module so that the camera is located in the second position, based on the determination that the user is present; and an inputter configured to receive a user input.

The first image may include a low-resolution image. The second image may include a high-resolution image.

The driver may include a camera driver configured to move the camera. The controller may be configured to control the camera driver to move the camera in a vertical direction so that the camera is located in the first position or the second position.

The driver may include a camera driver configured to move the camera and a reflection module driver configured to move the reflection module. The controller may be configured to control the camera driver and the reflection module driver to move the camera in a vertical direction or the reflection module in the vertical direction so that the camera is located in the first position or the second position.

The driver may include a reflection module driver configured to move the reflection module. The controller may be configured to control the reflection module driver to move the reflection module in a vertical direction so that the camera is located in the first position or the second position.

The controller may be configured to control the driver to move at least one of the camera and the reflection module so that the camera is located at a third position where an external image cannot be captured.

The controller may be configured to turn off a power of the camera so that the camera in the first position or the second position cannot capture an external image.

The controller may be configured to turn on the display apparatus based on the determination that the user exists, and to turn off the display apparatus based on the determination that the user does not exist.

The controller may be configured to control the driver according to a first mode, based on the inputter receiving the selection of the first mode from the user. In the first mode, the camera may be configured to capture the first image in the first position in response to the absence of the user, and to capture the second image in the second position in response to the presence of the user.

The controller may be configured to control the driver according to a second mode based on the inputter receiving the selection of the second mode from the user. In the second mode, the camera may be configured to not capture an external image.

The controller may be configured to control the driver according to a third mode, based on the inputter receiving the selection of the third mode from the user. In the third mode, the camera may be configured to capture the second image at the second position in response to the presence and absence of the user.

The controller may be configured to control the driver according to a fourth mode, based on the inputter receiving the selection of the fourth mode from the user. In the fourth mode, the camera may be configured to capture the first image at the first position in response to the presence and absence of the user.

The controller may include a camera controller and a main controller. The camera controller may be configured to wake up the main controller in response to determining that the user exists based on the first image.

The main controller may be configured to switch the display apparatus to an off-standby state based on the absence of the user in response to the display apparatus being turned on, and to be activated in the off-standby state and not display the image on a display panel.

The main controller may be configured to be deactivated and turn off the display apparatus in response to a lapse of a predetermined time after switching to the off-standby state.

The main controller may be configured to switch the display apparatus to an on-standby state based on the presence of the user in response to the display apparatus being turned off, and to be activated in the on-standby state and not display the image on a display panel.

The main controller may be configured to turn on the display apparatus in response to receiving a predetermined user input after switching to the on-standby state.

The reflection module may include two reflectors facing each other. At least one of the two reflectors has a convex shape.

According to another aspect of the disclosure, there is provided a method of controlling a display apparatus including: capturing, by a camera, a low-resolution image in a first position located at the rear of a reflection module; determining, by a controller, whether a user exists based on the low-resolution image; in response to determining that the user exists, moving, by the controller, at least one of the camera and the reflection module so that the camera is located in a second position exposed to the outside; and capturing, by the camera, a high-resolution image in a second position.

The method may further include determining, by the controller, whether a user exists based on the high-resolution image captured by the camera in the second position; and in response to determining that the user does not exist, moving, by the controller, at least one of the camera and the reflection module so that the camera is located in the first position.

The method may further include receiving, by an inputter, a selection of a mode related to an exposure degree of the camera from the user. The mode related to the exposure degree of the camera may include a first mode in which the camera is located in the first position in response to the presence of the user and the camera is located in the second position in response to the absence of the user; and a second mode in which the camera cannot capture an external image including the low-resolution image and the high-resolution image.

The method may further include, in response to receiving the selection of the second mode, moving, by the controller, at least one of the camera and the reflection module so that the camera is located at a third position where the external image cannot be captured.

The method may further include, in response to receiving the selection of the second mode, turning off, by the controller, a power of the camera.

The method may further include, in response to determining that the user exists as a result of determining whether the user exists based on the low-resolution image, turning on, by the controller, the display apparatus.

The method may further include, in response to determining that the user does not exist as a result of determining whether the user exists based on the high-resolution image, turning off, by the controller, the display apparatus.

The display apparatus may include a camera controller configured to process the low-resolution image and a main controller configured to process the high-resolution image. The method may further include, in response to the absence of the user, activating the camera controller and deactivating the main controller; and activating the main controller by transmitting a wake-up signal from the camera controller to the main controller in response to the presence of the user.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 14 is a diagram illustrating the relative positions of a camera and a reflection module when a display apparatus can move only the reflection module according to an embodiment.

FIG. 15 is an example of a first image that can be captured by a camera of a display apparatus according to an embodiment.

DETAILED DESCRIPTION

Figure 1:
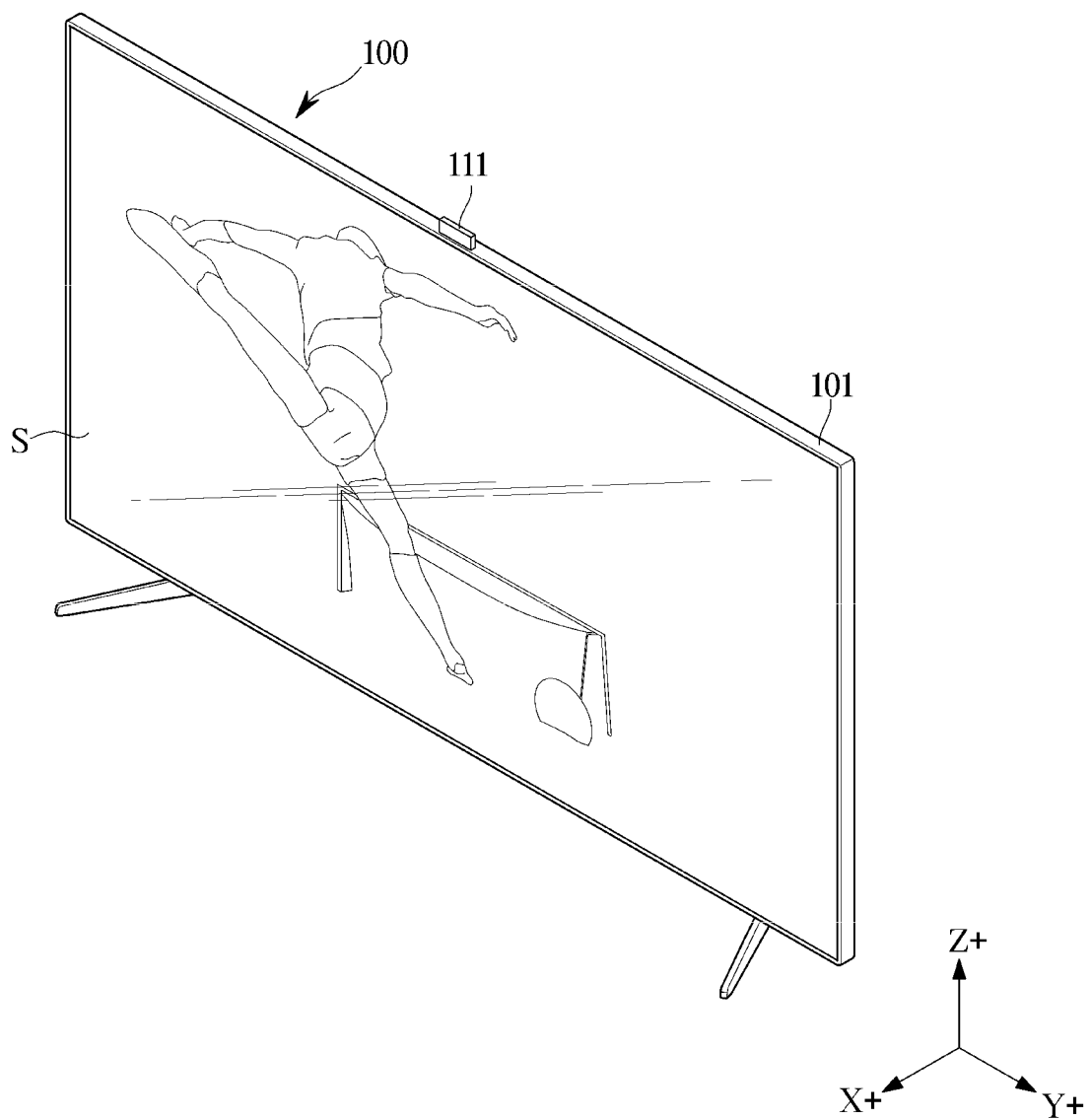
FIGS. 1 to 4 are external views illustrating an example of a display apparatus according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Throughout the description, when a component transfers or transmits a signal or data to another component, it is noted that there is another component between the component and the other component and the signal or data is transferred or transmitted through the component, unless there is a particular description contrary thereto.

It is to be understood that the singular forms "a," "an," and "the" include plural references unless the context clearly dictates otherwise.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

An identification code is used for the convenience of the description but is not intended to illustrate the order of each step. Each of the steps may be implemented in an order different from the illustrated order unless the context clearly indicates otherwise.

An aspect of the disclosure provides a display apparatus that can be appropriately used for user detection and camera-related functions by capturing a low-resolution image and a high-resolution image using a single camera, by capturing an image while the camera is located at the rear of a reflection module and detecting the presence of a user when the user does not exist, and by capturing the image with the camera exposed to the outside when the user exists, and a method of controlling the display apparatus.

Another aspect of the disclosure provides a display apparatus capable of protecting privacy according to user preferences by allowing the user to select a degree to which the camera is exposed, and a method of controlling the display apparatus.

Hereinafter, embodiments of a display apparatus complex and a method of controlling the display apparatus including the same will be described in detail with reference to the accompanying drawings.

FIGS. 1 to 4 are external views illustrating an example of a display apparatus according to an embodiment.

Referring to FIGS. 1 to 4, an appearance of a display apparatus 100 may be implemented by a frame 101 in which various parts are embedded or supporting them, and a screen S on which an image is displayed.

The frame 101 may include at least one of a bezel, a front chassis, and a rear chassis, and the screen S corresponds to a surface on which a display panel supported by the frame 101 outputs the image.

In an embodiment to be described later, a direction in which the display apparatus 100 outputs the image, that is, a +x direction will be referred to as a front and an opposite direction will be referred to as a rear. In addition, a +z direction is referred to as upward and an opposite direction is referred to as downward.

The display apparatus 100 may include a reflection module 111 and a camera 112 that may be exposed to the outside. According to various examples applicable to the display apparatus 100, the reflection module 111 may be fixed and only the camera 112 may be moved, and both the reflection module 111 and the camera 112 may be moved. The camera 112 may be fixed and it is possible to move only the reflection module 111. A detailed description of each example will be described later.

The example of FIGS. 1 to 4 relates to a case where the reflection module 111 is fixed and only the camera 112 is moved.

Figure 2:
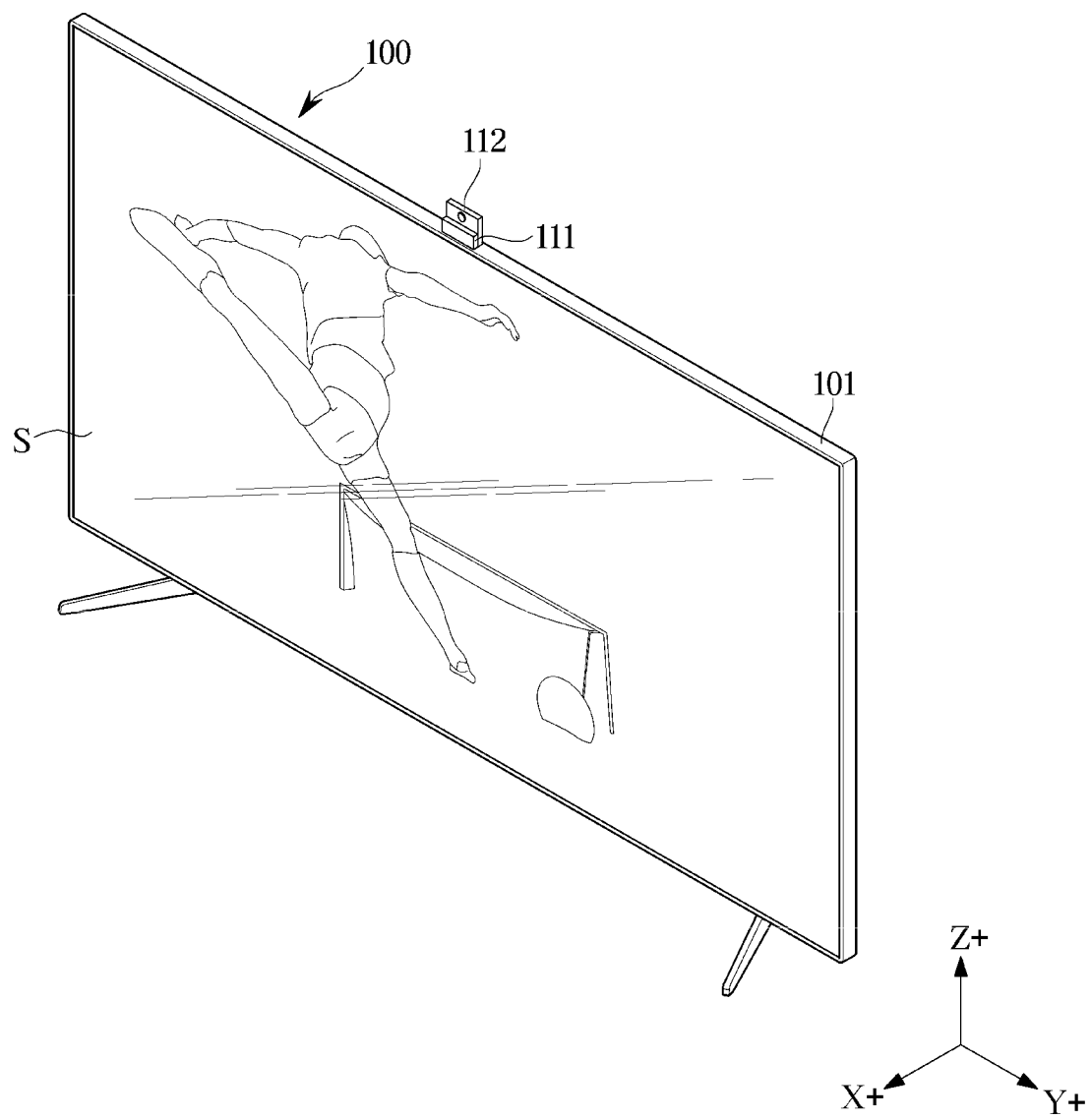

As illustrated in FIGS. 1 and 2, the reflection module 111 is fixed in a state exposed to the top of the display apparatus 100, and the camera 112 may be located at the rear of the reflection module 111 as illustrated in FIG. 1 or exposed upwards of the reflection module 111 as illustrated in FIG. 2. That is, the camera 112 may move in a vertical direction and may be located at a position of FIG. 1 or 2.

Figure 3:
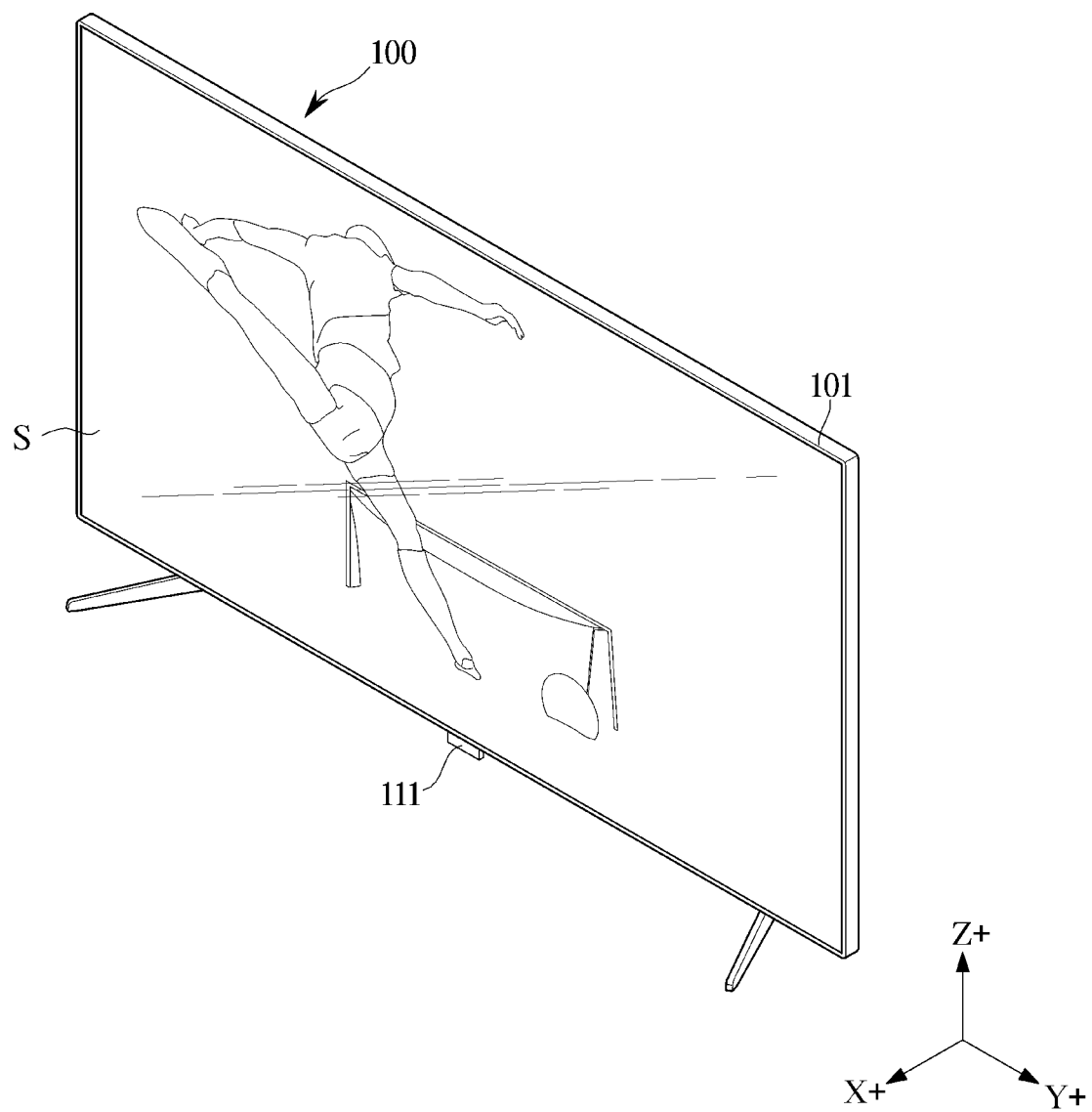
Figure 4:
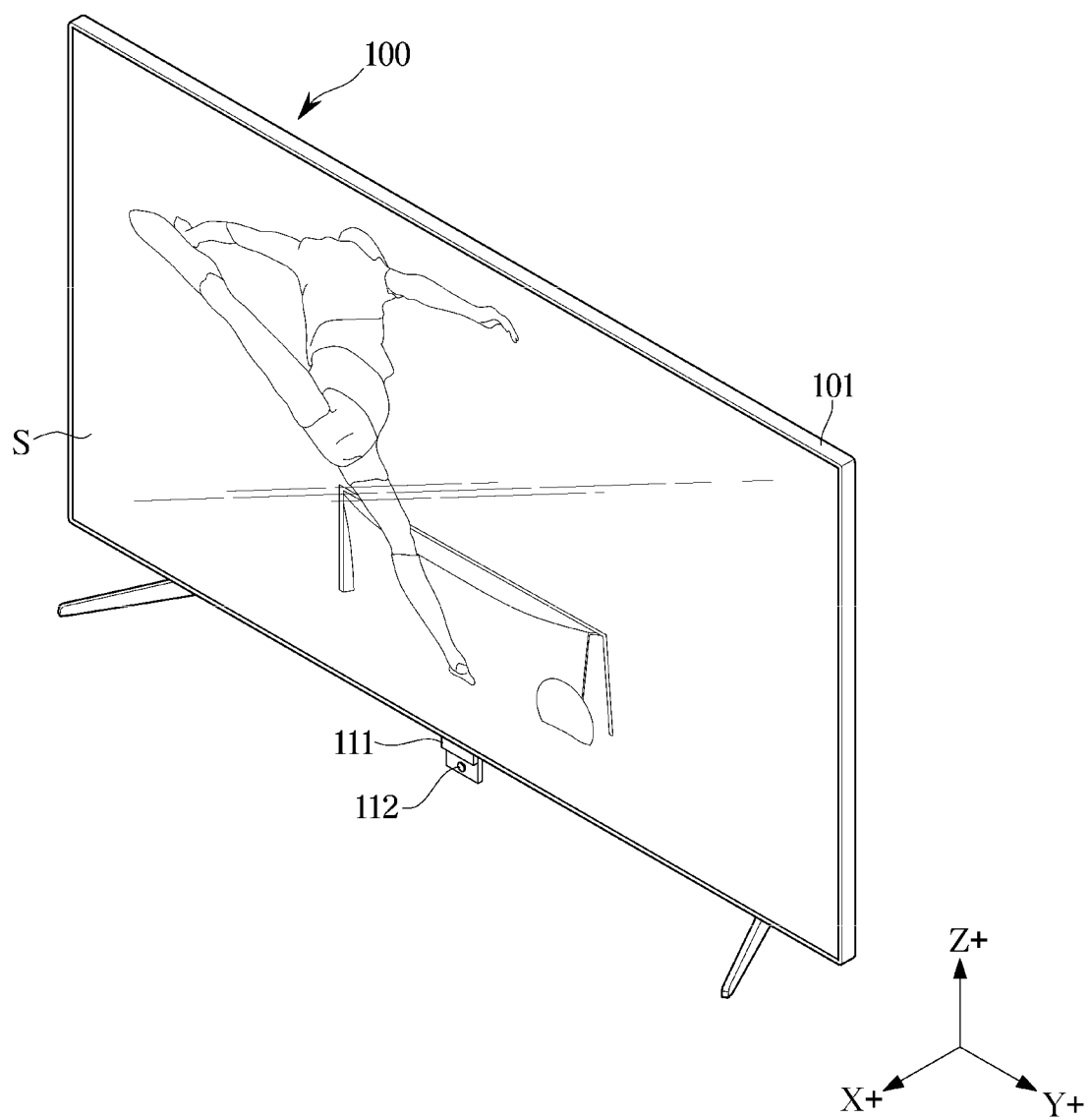

Alternatively, as illustrated in FIGS. 3 and 4, the reflection module 111 and the camera 112 may be provided under the display apparatus 100. In this case, the reflection module 111 is fixed to be exposed to a lower portion of the display apparatus 100, and the camera 112 may be located at the rear of the reflection module 111 as illustrated in FIG. 3 or exposed to the bottom of the reflection module 111. That is, the camera 112 may move in the vertical direction and may be located at a position of FIG. 3 or 4.

Figure 5:
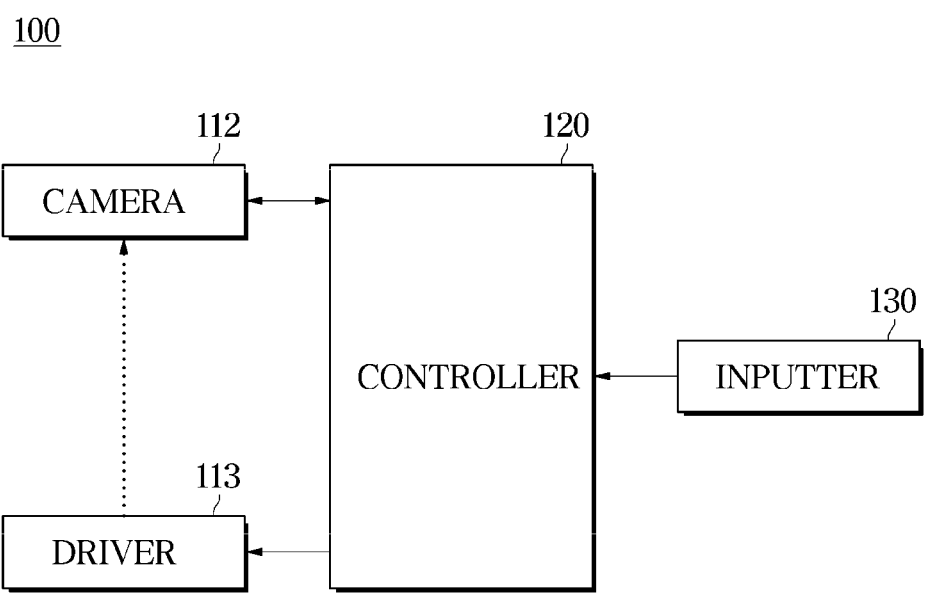
FIG. 5 is a control block diagram of a display apparatus according to an embodiment.
Figure 6:
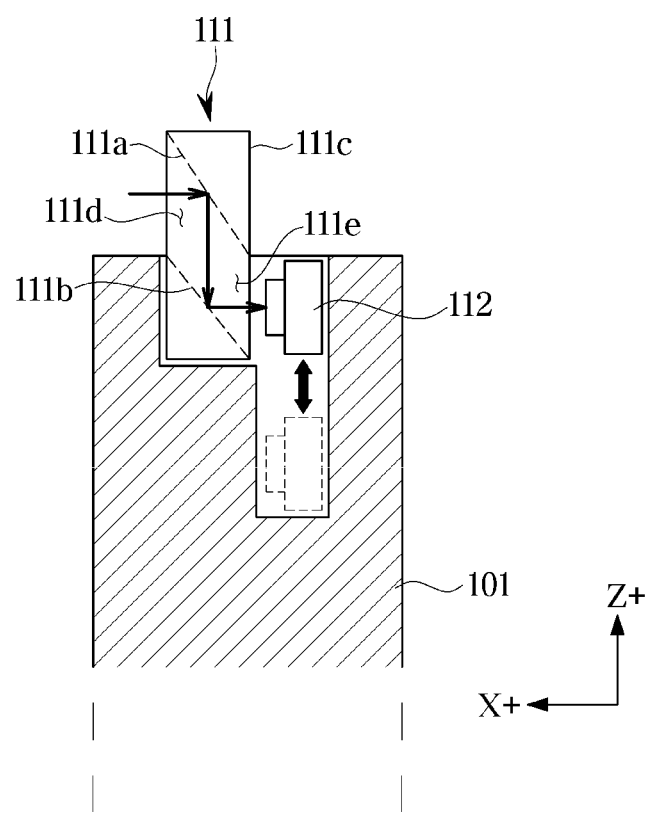
FIGS. 6 to 8 are views illustrating examples of relative positions of a reflection module and a camera of a display apparatus according to an embodiment.
Figure 7:
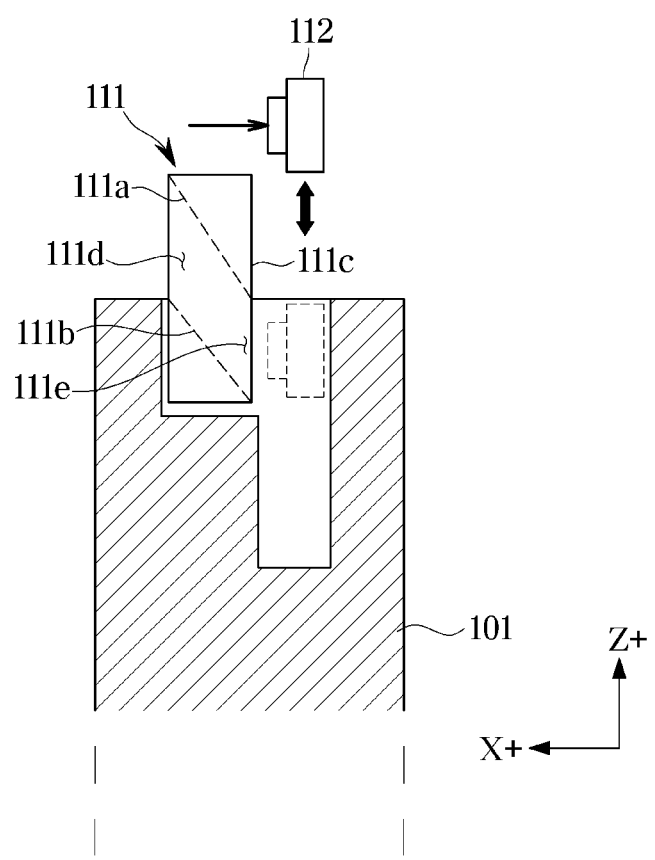
Figure 8:
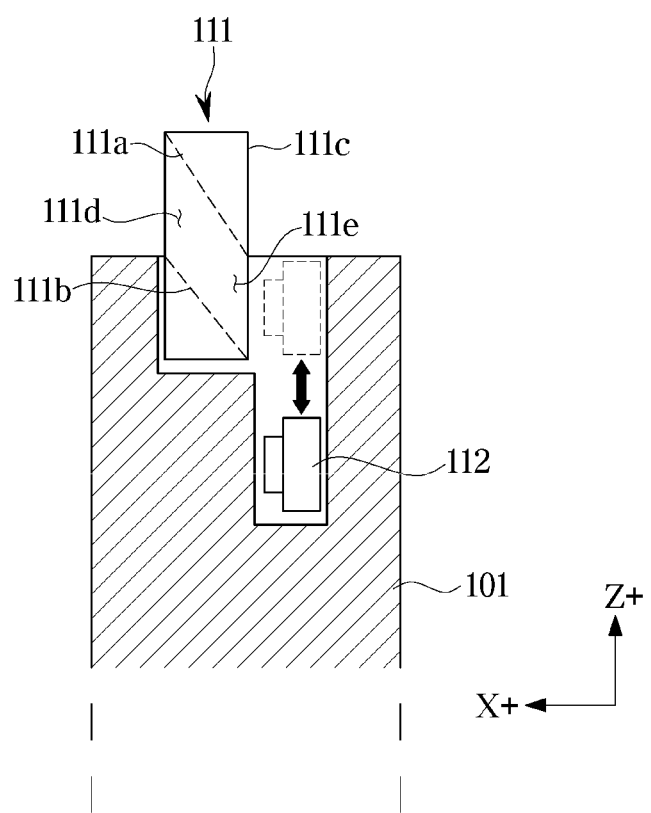

FIG. 5 is a control block diagram of a display apparatus according to an embodiment, and FIGS. 6 to 8 are views illustrating an example of relative positions of a reflection module and a camera of a display apparatus according to an embodiment.

FIGS. 6 to 8 are views schematically illustrating side cross-sections parallel to an xz plane.

Referring to FIG. 5, the display apparatus 1 may include the camera 112 for obtaining a first image at a first position located at the rear of the reflection module 111 and obtaining a second image at a second position exposed to the outside of the reflection module 111, a driver 113 for moving the camera 112 or the reflection module 111, a controller 120, and an inputter 130 for receiving a user's input.

The controller 120 may determine the presence of a user based on the first image captured by the camera 112 at the first position. When it is determine that the user is present, the controller 120 may control the driver 113 to move at least one of the camera 112 and the reflection module 111 so that the camera 112 is located at the second position.

The reflection module 111 may transmit light coming from the front of the display apparatus 100 to the camera 112 located at the rear of the reflection module 111 by using a reflector. For example, as illustrated in FIGS. 6 to 8, the reflection module 111 may include two reflectors 111a and 111b, and the two reflectors 111a and 111b may be mounted parallel to each other while inclined 45 degrees from a horizontal plane, that is, an x-y plane. A housing 111c of the reflection module 111 may support the two reflectors 111a and 111b.

The camera 112 may be in the first position located at the rear of the reflection module 111 and the second position exposed to the outside of the display apparatus 100 without being located at the rear of the reflection module 111.

As described above, in the display apparatus 100 according to the embodiment, the camera 112 may move, the reflection module 111 may move, and both the camera 112 and the reflection module 111 may move.

The first and second positions of the camera 112 may indicate relative positions with respect to the reflection module 111. That is, whether the camera 112 is in the first position or the second position may be determined according to the relative positions of the camera 112 and the reflection module 111.

Regardless of which one of the camera 112 and the reflection module 111 moves, when the camera 112 is in the first position, it is located at the rear of the reflection module 112 and may generate the image by light transmitted from the reflection module 111. When the camera 112 is in the second position, it is not located at the rear of the reflection module 112 but is exposed to the outside of the display apparatus 100 and may generate the image by light directly incident from the front of the display apparatus 100 without passing through the reflection module 111.

The driver 113 may include various structures capable of moving the reflection module 111 or the camera 112, a motor that provides power to the structures, and a driving circuit that drives the motor. For example, the driver 113 may move the reflection module 111 or the camera 112 in the vertical direction, that is, in the z-axis direction.

In the display apparatus 100, before the user is detected, the camera 112 may capture the first image at the first position, and when the user is detected, the camera 112 may capture the second image at the second position.

To this end, the controller 120 may determine the presence of the user based on the first image captured when the camera 112 is in the first position. When it is determined that the user exits, the controller 120 may control the driver 113 to move at least one of the camera 112 and the reflection module 111 so that the camera 112 is located in the second position.

In an example in which the camera 112 moves, the controller 120 may move the camera 112 upward or downward so that the camera 112 is not located at the rear of the reflection module 111 and is exposed to the outside. In an example in which the module 111 moves, the controller 120 may move the reflection module 111 upward or downward so that the reflection module 111 does not cover the camera 112.

The controller 120 may determine the presence of the user by applying an image processing algorithm such as an object recognition algorithm to the first image captured when the camera 112 is in the first position. For example, when an object having a predetermined feature is recognized, the controller 120 may determine that the user exists. The predetermined feature may be the same or similar to the feature of a shape of a human body. As another example, when the object that did not exist in a previous image is recognized irrespective of the shape of the human body, the controller 120 may determine that the user exists.

Also, the controller 120 may determine that the user exists when the recognized object is continuously recognized for more than a predetermined reference time. In addition, when the object corresponding to the user is not continuously recognized for more than the predetermined reference time, the controller 120 may determine that the user does not exist. The reference time when determining that the user exists and the reference time when determining that the user does not exist may be different or may be the same.

The controller 120 may include at least one memory in which a program for performing the above-described operation and an operation described later is stored, and at least one processor that executes the stored program. When a plurality of memories or processors are provided, they may be integrated on a single chip or may be physically separated.

The inputter 130 may receive the user's input. The user's input may include at least one of various types of inputs necessary for the user to use the display apparatus 100 such as on/off of the display apparatus 100, a channel change, a screen adjustment, a setting change of the display apparatus 100, a volume adjustment, etc.

The inputter 130 may be provided on the frame 101 as a button or a touch pad type, or may be provided on a remote controller. When the user inputs a command using gestures or facial expressions, the camera 112 may be included in the inputter 130.

In addition, the inputter 130 may also receive a selection regarding an exposure degree of the camera 112 from the user. The controller 120 may change the position of the camera 112 to the first position or the second position by controlling the driver 113 according to the user's selection regarding the exposure degree of the camera 112. By allowing the user to select the exposure degree of the camera 112, appropriate privacy protection can be performed according to user preferences. A detailed description of this will be described later.

FIGS. 6 to 8 are views illustrating examples in which the reflection module 111 is fixed and the camera 112 moves.

Referring to FIG. 6, a part of the reflection module 111 may be fixed inside the frame 101 and the other part may be fixed to the top of the display apparatus 100 while being exposed to the outside. As described above, the two reflectors 111a and 111b of the reflection module 111 may be fixed parallel to each other while inclined 45 degrees from the x-y plane.

When the first reflector 111a to which light is incident from the front of the display apparatus 100 is implemented in a convex shape, an angle of view of the first image may be extended. For example, the first reflector 111a may be implemented in a fan shape and mounted on the housing 111c in a convexly bent state.

The light incident from the front of the display apparatus 100 through a front opening 111d is reflected by the first reflector 111a to incident the second reflector 111b, and the light reflected by the second reflector 111b may be emitted to the rear of the reflection module 111 through a rear opening 111e. A height at which the reflection module 111 is exposed to the top of the display apparatus 100 may be determined in consideration of such a movement path of light.

The camera 112 may be arranged to face the front of the display apparatus 100.

FIG. 6 illustrates a case where the camera 112 is in the first position.

Referring to FIG. 6, when the camera 112 is in the first position, the camera 112 may be located inside the frame 101 and at the same time be located at the rear of the reflection module 111.

In addition, when the camera 112 is in the first position, the camera 112 may be located at a position corresponding to the rear opening 111e of the reflection module 111, i.e., at a position facing the rear opening 111e of the reflection module 111.

Therefore, when the camera 112 is in the first position, the image may be generated by light incident through the reflection module 111, and in this embodiment, this image will be referred to as the first image.

On the other hand, when the frame 101 is the bezel, a space in which the reflection module 111 is disposed and a space in which the camera 112 can move may be formed inside the bezel. Further, when the frame 101 is the front chassis or the rear chassis, a space may be formed in the front chassis or the rear chassis, or an empty space between structures constituting the front chassis or the rear chassis may be utilized.

FIG. 7 illustrates a case where the camera 112 is in the second position.

Referring to FIG. 7, when the camera 112 is in the second position, the camera 112 may be exposed to the outside of the frame 101 and be located above the reflection module 111.

Therefore, when the camera 112 is in the second position, the image may be generated by light directly incident from the front of the display apparatus 100 without passing through the reflection module 111, and in this embodiment, this image will be referred to as the second image.

The controller 120 may move the camera 112 upward by controlling the driver 113 to change the position of the camera 112 from the first position to the second position, and may move the camera 112 downward by controlling the driver 113 to change the position of the camera 112 from the second position to the first position.

Meanwhile, the relative position of the camera 112 may include a third position in which an external image cannot be captured. Here, the external image may refer to an image captured outside the display apparatus 100, particularly an image captured in front of the display apparatus 100, and the first image and the second image may be included in the external image.

As illustrated in FIG. 8, when the camera 112 is in the third position, the camera 112 may be located inside the display apparatus 100, i.e., inside the frame 101 and located below the reflection module 101. That is, since the camera 112 is located at a position not corresponding to the rear opening 111e of the reflection module 101, the light incident through the reflection module 101 may not be received, and the external image of the display apparatus 100 may not be captured.

When the camera 112 is in the first position or the second position, the controller 120 may move the camera 112 downward by controlling the driver 113 to change the relative position of the camera 112 to the third position.

In the examples of FIGS. 6 to 8, a case where the reflection module 111 and the camera 112 are provided on the display apparatus 100 is exemplified, but as described above, the reflection module 111 and the camera 112 may be provided under the display apparatus 100. In this case, the controller 120 may move the camera 112 downward by controlling the driver 113 to change the relative position of the camera 112 from the first position to the second position, and may move the camera 112 upward by controlling the driver 113 to change the relative position of the camera 112 from the second position to the first position. In order to change the relative position of the camera 112 to the third position, the controller 120 may control the driver 113 to move the camera 112 further upward.

Hereinafter, an example in which both the camera 112 and the reflection module 111 can move will be described.

Figure 9:
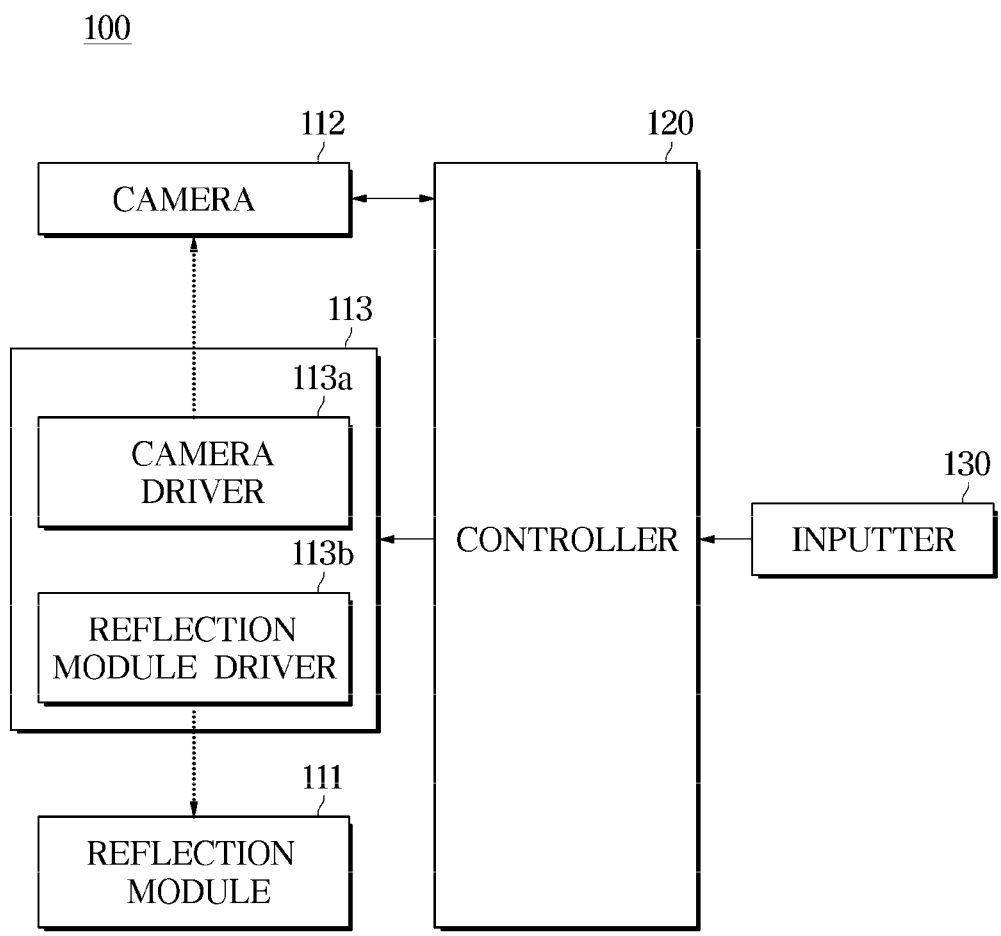
FIG. 9 is a control block diagram illustrating a case in which a display apparatus can move both a camera and a reflection module according to an embodiment.
Figure 10:
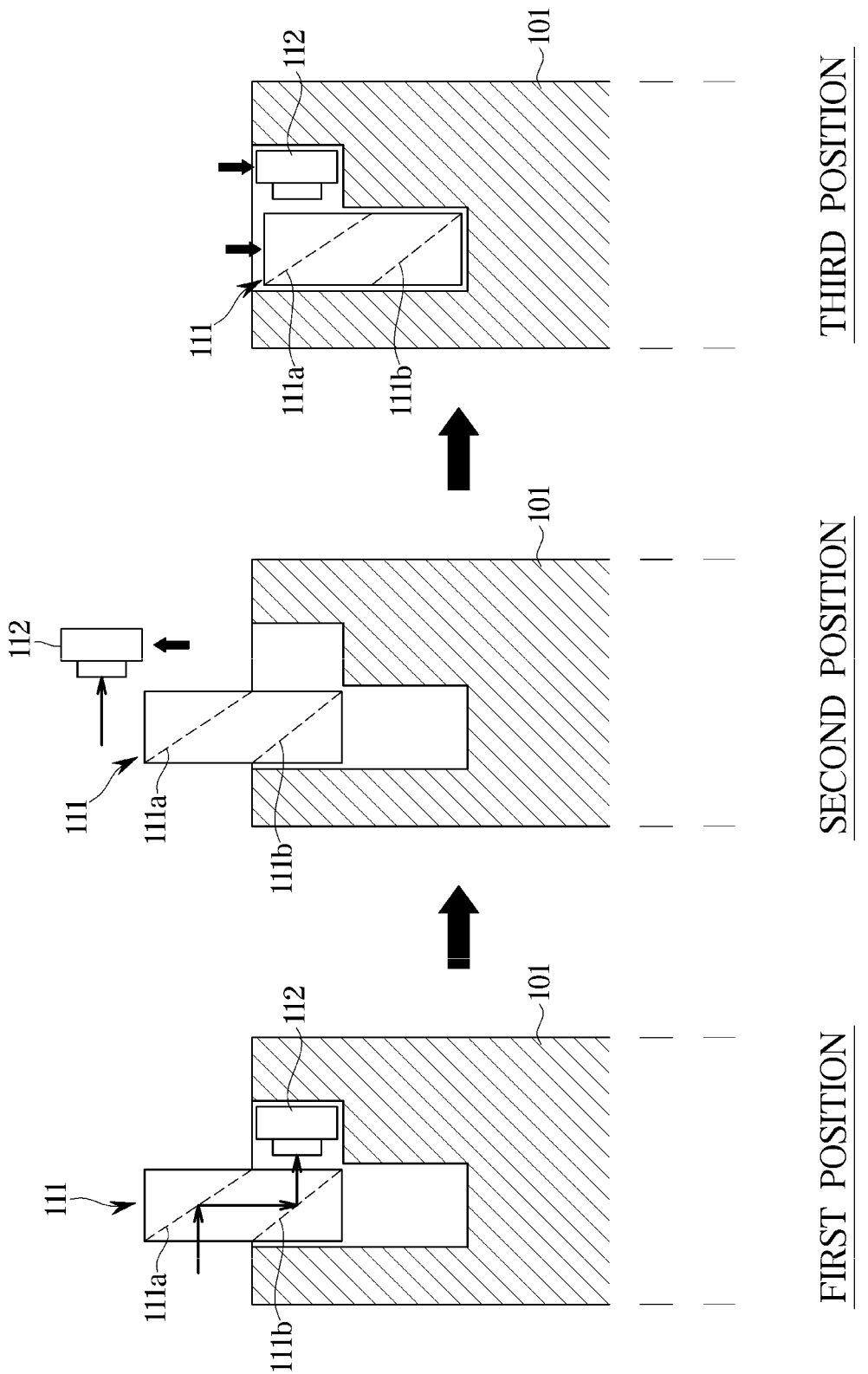
FIGS. 10 to 12 are views illustrating relative positions of a camera and a reflection module when a display apparatus can move both the camera and the reflection module according to an embodiment.
Figure 11:
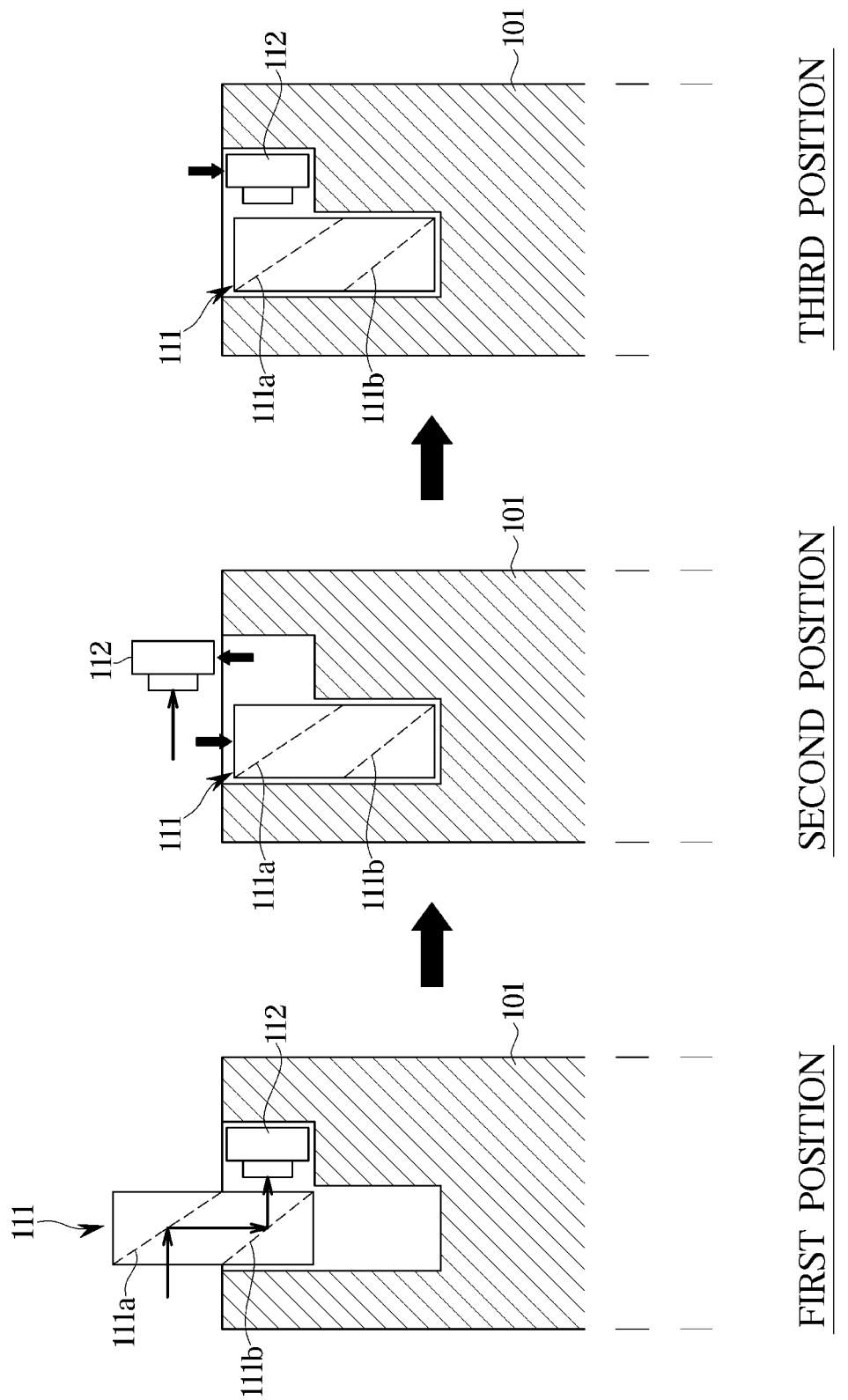
Figure 12:
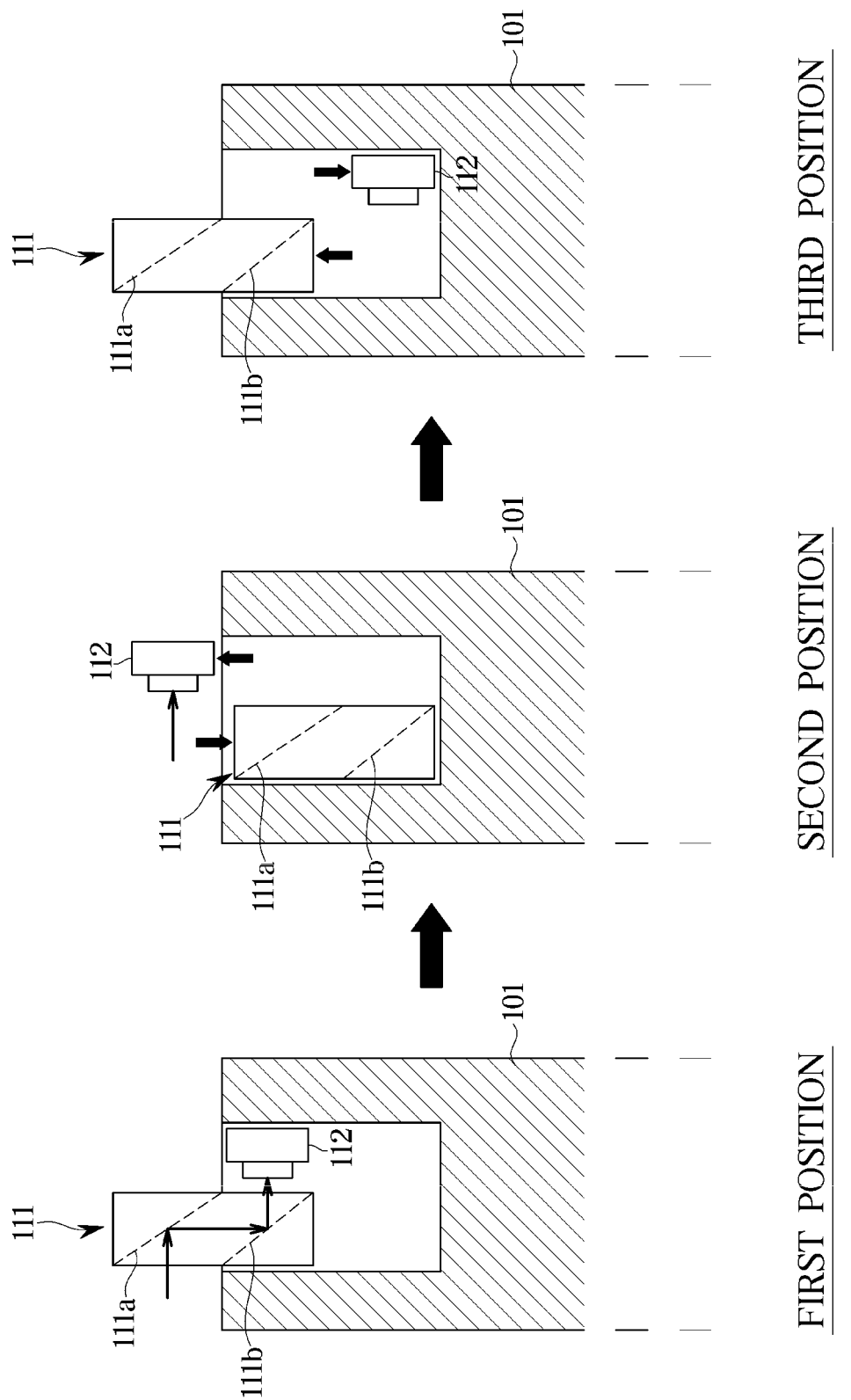

FIG. 9 is a control block diagram illustrating a case in which a display apparatus can move both a camera and a reflection module according to an embodiment, and FIGS. 10 to 12 are views illustrating relative positions of a camera and a reflection module when a display apparatus can move both the camera and the reflection module according to an embodiment.

Referring to FIG. 9, the driver 113 of the display apparatus 100 may include a camera driver 113a for moving the camera 112 and a reflection module driver 113b for moving the reflection module 111.

The controller 112 may move the camera 112 by controlling the camera driver 113a or may move the reflection module 111 by controlling the reflection module driver 113b to change the relative position of the camera 112 to the first position, the second position, or the third position.

Hereinafter, various examples of moving the camera 112 and the reflection module 111 will be described with reference to FIGS. 10 to 12.

In the examples of FIGS. 10 to 12, it is illustrated that the relative position of the camera 112 is changed from the first position to the second position and from the second position to the third position, but the embodiment of the display apparatus 100 is not limited thereto. It goes without saying that the relative position may change according to various orders, such as changing from the second position to the first position, from the first position to the third position, or from the third position to the first position or second position.

Referring to the example of FIG. 10, when the relative position of the camera 112 is the first position, the positions of the camera 112 and the reflection module 111 are the same as described with reference to FIG. 6, and the relative position of the camera 112 when is the second position. When the relative position of the camera 112 is the second position, the positions of the camera 112 and the reflection module 111 are as described above with reference to FIG. 7.

When the relative position of the camera 112 is the third position, the reflection module 111 may be located inside the display apparatus 100, that is, inside the frame 101 so that the light does not incident the first reflector 111a from the outside of the display apparatus 100. Particularly, all the first reflectors 111a may be located inside the display apparatus 100, and the camera 112 may also be located inside the display apparatus 100 without being exposed to the outside of the display apparatus 100.

The controller 120 may control the camera driver 113a and the reflection module driver 113b to change the relative position of the camera 112 from the second position to the third position so that both the camera 112 and the reflection module 111 move downward. Since there is no light entering through the reflection module 111, the camera 112 may be located at the rear of the reflection module 111. Therefore, compared to the example of FIG. 8 described above, the moving path of the camera 112 may be shortened.

In addition, it is possible to change the position of the camera 112 from the first position to the third position. In this case, the controller 120 may control the reflection module driver 113b without moving the camera 112 to move only the reflection module 111 downward.

Referring to the example of FIG. 11, when the relative position of the camera 112 is the first position, the positions of the camera 112 and the reflection module 111 are as described above with reference to FIG. 6. When the relative position of the camera 112 is the third position, the positions of the camera 112 and the reflection module 111 are as described above with reference to FIG. 10.

When the relative position of the camera 112 is the second position, the reflection module 111 may be located inside the display apparatus 100, that is, inside the frame 101, and the camera 112 may be exposed to the outside the display apparatus 100. Since the reflection module 111 is located inside the display apparatus 100, the camera 112 only needs to be exposed to the outside of the display apparatus 100, and as illustrated in the example of FIG. 10, it is not necessary to separate the camera 112 from the top of the display apparatus 100 by the height of the reflection module 111 exposed to the outside of the display apparatus 100. Accordingly, a length of a portion protruding from the frame 101 of the display apparatus 100 may be reduced.

The controller 120 may move the camera 112 upward by controlling the camera driver 113a and move the reflection module 111 downward by controlling the reflection module driver 113b to change the relative position of the camera 112 from the first position to the second position.

In addition, in order to change the position of the camera 112 from the second position to the third position, the camera driver 113a may be controlled to move the camera 112 downward.

In addition, it is possible to change the relative position of the camera 112 from the first position to the third position, from the second position to the first position, or from the third position to the first position.

Particularly, the controller 120 may move only the reflection module 111 downward by controlling the reflection module driver 113b without moving the camera 112 to change the relative position of the camera from the first position to the third position.

The controller 120 may move the reflection module 111 upward by controlling the reflection module driver 113b and move the camera 112 downward by controlling the camera driver 113a to change the relative position of the camera 112 from the second position to the first position.

In addition, the controller 120 may move only the reflection module 111 upward by controlling the reflection module driver 113b without moving the camera 112 to change the relative position of the camera from the third position to the first position.

Referring to the example of FIG. 12, when the relative position of the camera 112 is the first position and the second position, the positions of the camera 112 and the reflection module 111 are as described above with reference to FIG. 11. When the relative position of the camera 112 is the third position, the positions of the camera 112 and the reflection module 111 are as described above with reference to FIG. 8. Accordingly, descriptions of the respective positions of the camera 112 and the reflection module 111 when the relative positions of the camera 112 are the first position, the second position, and the third position will be omitted.

The controller 120 may move the camera 112 upward by controlling the camera driver 113a and move the reflection module 111 downward by controlling the reflection module driver 113b to change the relative position of the camera 112 from the first position to the second position.

In addition, the controller 120 may move the camera 112 downward by controlling the camera driver 113a without moving the reflection module 111 to change the relative position of the camera from the first position to the third position. Since the part of the reflection module 111 is exposed to the outside of the display apparatus 100 and light is emitted through the rear opening 111e, the controller 120 may move the camera 112 to be located below the rear opening 111e.

As illustrated in FIGS. 10 to 12 described above, even in the example in which both the camera 112 and the reflection module 111 are movable, it is possible to provide the camera 112 and the reflection module 111 under the display apparatus 100. When the camera 112 and the reflection module 111 are provided under the display apparatus 100, moving directions of the camera 112 and the reflection module 111 described above may be reversed.

On the other hand, it is also possible to turn off a power of the camera 112 without changing the relative position of the camera 112 to prevent capturing of the external image. In this case, in the examples of FIGS. 8 and 10 to 12 described above, the controller 120 may turn off the power of the camera 112 in the first position or the second position without placing the relative position of the camera 112 in the third position.

Figure 13:
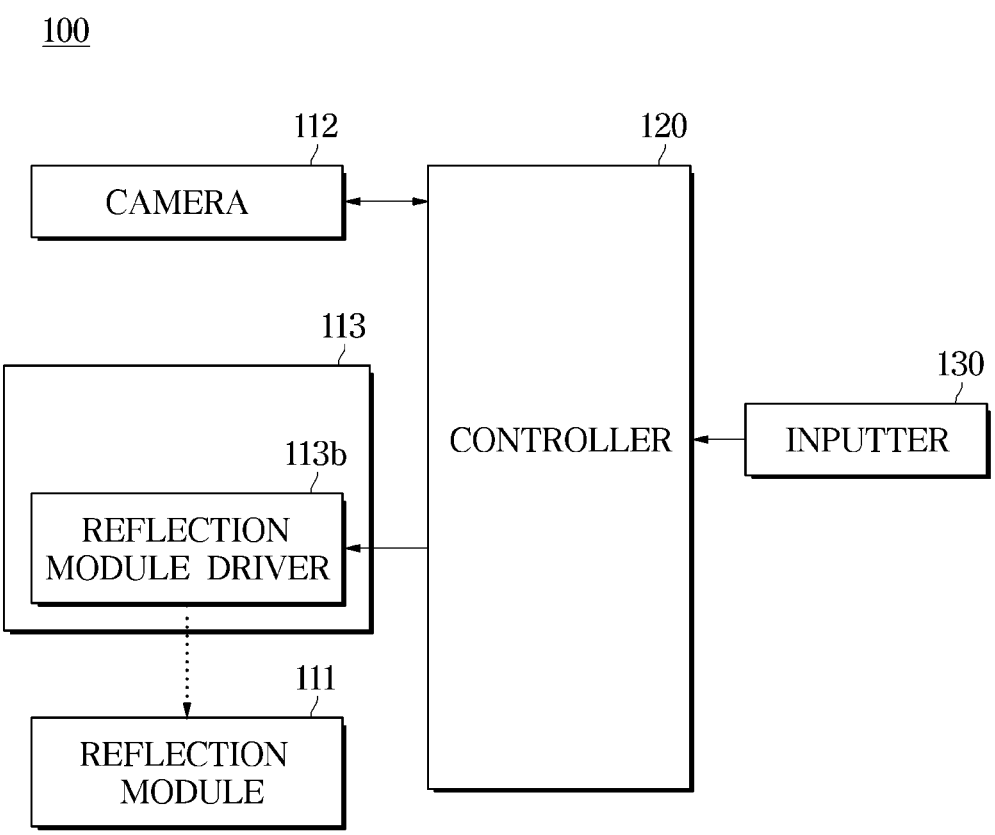
FIG. 13 is a control block diagram illustrating a case in which only a reflection module of a display apparatus can be moved according to an embodiment.

FIG. 13 is a control block diagram illustrating a case in which only a reflection module of a display apparatus can be moved according to an embodiment, and FIG. 14 is a diagram illustrating the relative positions of a camera and a reflection module when a display apparatus can move only the reflection module according to an embodiment.

Referring to FIG. 13, the driver 113 may include the reflection module driver 113b, and the controller 120 may move the reflection module 111 by controlling the reflection module driver 113b to change the relative position of the camera 112. In this case, the camera 112 may be fixed without moving.

Referring to the example of FIG. 14, the camera 112 may be mounted on the display apparatus 100 in the state exposed to the outside. The camera 112 may be fixed so as not to move. The reflection module 111 may be provided so as to be movable in the vertical direction, and when the relative position of the camera 112 is in the first position, it may be located in front of the camera 112 while being exposed to the top of the display apparatus 100 like the camera 112.

At this time, the rear opening 111e of the reflection module 111 may be located to face the camera 112, and the light emitted through the rear opening 111e through the first reflector 111a and the second reflector 111b may be incident on the camera 112. That is, even if both the reflection module 111 and the camera 112 are exposed to the outside, as in the above-described examples, when the relative position of the camera 112 is in the first position, the camera 112 may generate the first image by light incident through the reflection module 111.

When the relative position of the camera 112 is in the second position, the reflection module 111 may be located inside the display apparatus 100. Since the reflection module 111 is not located in front of the camera 112 while the camera 112 is exposed to the outside of the display apparatus 100, the camera 112 may generate the second image by directly receiving light incident from the front of the display apparatus 100 without passing through the reflection module 111.

The controller 120 may move the reflection module 111 downward by controlling the reflection module driver 113b to change the relative position of the camera 112 from the first position to the second position. In order to change the relative position of the camera 112 from the second position to the first position, the controller 120 may move the reflection module 111 upward by controlling the reflection module driver 113b.

Meanwhile, in order to prevent the camera 112 from capturing the external image, the controller 120 may turn off the power of the camera 11. In some cases, the power may be turned off when the relative position of the camera 112 is in the first position or the second position.

As illustrated in the examples of FIGS. 13 and 14, when only the reflection module 111 is moved, a control logic for changing the relative position of the camera 112 and the structure of the driver 113 may be simplified, and an area protruding from the frame 101 of the display apparatus 100 may be minimized.

As illustrated in FIG. 14, even in the example in which only the reflection module 111 is movable, it is possible to provide the camera 112 and the reflection module 111 under the display apparatus 100. When the camera 112 and the reflection module 111 are provided under the display apparatus 100, the moving direction of the reflection module 111 described above may be reversed.

As described above, the image obtained when the relative position of the camera 112 is in the first position may be the first image, and the image obtained when the relative position of the camera 112 is in the second position may be the second image. Hereinafter, the first image and the second image will be described in detail.

Figure 16:
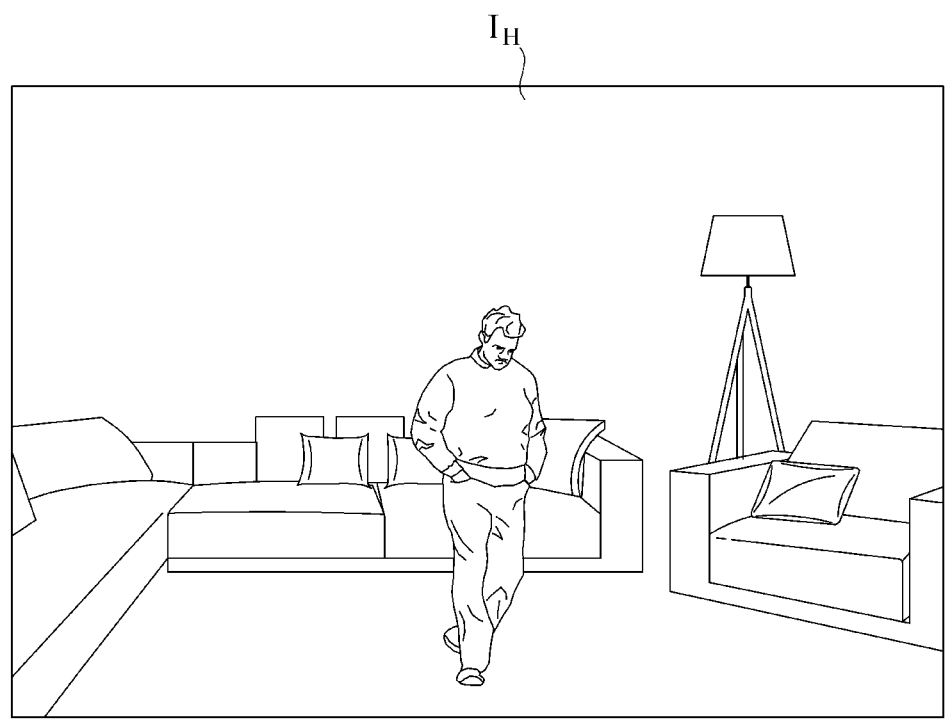
FIG. 16 is an example of a second image that can be captured by a camera of a display apparatus according to an embodiment.

FIG. 15 is an example of a first image that can be captured by a camera of a display apparatus according to an embodiment, and FIG. 16 is an example of a second image that can be captured by a camera of a display apparatus according to an embodiment.

The first image is the image obtained when the reflection module 111 is located in front of the camera 112, that is, the image generated by light incident through the reflection module 111. The second image is the image obtained when the reflection module 111 is not located in front of the camera 112, that is, the image generated by light directly incident from the front of the display apparatus 100 without passing through the reflection module 111. Accordingly, the first image may correspond to the low-resolution image and the second image may correspond to the high-resolution image.

In order to lower the resolution of the first image, the reflectors 111a and 111b included in the reflection module 111 may have a lower reflectance than a commonly used mirror. The reflectance of the reflectors 111a and 111b may be determined in consideration of both the privacy protection aspect of the user and the user recognition aspect.

Referring to the example of FIG. 15, first images IL1 and IL2 may be the low-resolution images capable of recognizing only a shape degree of the object located in front of the display apparatus 100 or a degree of recognizing only the presence or absence of the object.

For example, when an object O that has not been recognized in the previous first image IL1 is recognized in the current first image IL2, the controller 120 may determine that the user has appeared. That is, it can be determined that the user exists. In addition, when the object O is recognized for the predetermined reference time, the controller 120 may determine that the user exists. Accordingly, it is possible to prevent the relative position of the camera 112 from changing or the display apparatus 100 from turning on in a situation such as when the user passes in front of the display apparatus 100 without the purpose of use.

As another example, the controller 120 may determine that the user exists when the object having the predetermined feature is recognized in the first image. The predetermined feature may be the same or similar to the feature of the shape of the human body. Even in this case, when the object is recognized for the predetermined reference time, it may be determined that the user exists.

When it is determined that the user is present when the relative position of the camera 112 is the first position, the controller 120 may cause the camera 112 to take the second image by changing the relative position of the camera 112 to the second position. The method in which the controller 120 changes the relative position of the camera 112 from the first position to the second position is as described above.

As illustrated in FIG. 16, when the relative position of the camera 112 is the second position, the second image obtained by the camera 112 may be the high-resolution image that can be captured by a general camera. The resolution of the second image may be determined as a resolution suitable for performing camera-related functions performed by the display apparatus 100 such as gesture recognition, facial expression recognition, user recognition, and video call.

For example, when the display apparatus 100 performs a gesture recognition function, the controller 120 may recognize the user's gesture based on the second image captured by the camera 112 in the second position and perform an operation corresponding to the recognized gesture. For example, the operation corresponding to the recognized gesture may include at least one of channel change, volume adjustment, on/off of the display apparatus 100, and screen adjustment.

Alternatively, when the display apparatus 100 performs a user recognition function, the controller 120 may recognize the user's face based on the second image captured by the camera 112 in the second position, and may log in to the recognized user's account and provide a customized service for each user.

Also, the controller 120 may determine whether the user exists based on the second image. Previously, examples of changing the relative position of the camera 112 from the second position to the first position have been described. The controller 120 may determine whether the user exists based on the second image captured by the camera 112 in the second position. When it is determined that the user does not exist, the controller 120 may change the relative position of the camera 112 from the second position to the first position.

The above-described operation is only the example of a function that the display apparatus 100 can perform based on the second image, and it goes without saying that the display apparatus 100 can perform other functions.

According to the above example, in the display apparatus 100, the relative position of the camera 112 may vary depending on the presence or absence of the user, and thus, the resolution of the image captured by the camera 112 may vary. That is, when the user is not in front of the display apparatus 100, the low-resolution image is captured. By capturing the high-resolution image only when the user is in front of the display apparatus 100, that is, when it can be seen that the user is willing to use the display apparatus 100, a load on the processor for image processing is reduced, and camera-related functions desired by the user may be performed with high accuracy.

Meanwhile, the controller 120 may control on/off of the display apparatus 100 according to whether the user is present in front of the display apparatus 100.

For example, the controller 120 may turn off the display apparatus 100 if there is no the user in front of the display apparatus 100, and may turn on the display apparatus 100 if there is the user in front of the display apparatus 100. In this case, power consumption can be reduced by controlling the on/off of the display apparatus 100 according to whether the user actually views or not.

In addition, when the controller 120 turns off the display apparatus 100, the relative position of the camera 112 may be changed from the second position to the first position, and when the display apparatus 100 is turned on, the relative position of the camera 112 may be changed from the first position to the second position.

The display apparatus 100 may allow the user to select the exposure degree of the camera 112 to protect the user's privacy. For example, the user may input a selection of a mode related to the exposure degree of the camera 112 to the inputter 130. For example, the mode related to the exposure degree of the camera 112 may include a first mode and a second mode.

In the first mode, as in the above-described examples, when the user does not exist, the camera 112 may capture the low-resolution image in the first position, and when the user is present, the controller 120 may control the driver 113 and the camera 112 so that the camera 112 captures the high-resolution image in the second position.

Meanwhile, the controller 120 may determine whether the user exists based on the high-resolution image captured by the camera 112 in the second position. As a result of the determination, when the user does not exist, the relative position of the camera 112 may be changed from the second position to the first position.

In addition, in the first mode, the controller 120 may control on/off of the display apparatus 100 according to the presence of the user. For example, the controller 120 may determine whether the user exists based on the low-resolution image captured by the camera 112 in the first position while the display apparatus 100 is off. When it is determined that the user exists, the controller 120 may turn on the display apparatus 100 and change the relative position of the camera 112 from the first position to the second position.

The controller 120 may determine whether the user exists based on the high-resolution image captured by the camera 112 in the second position while the display apparatus 100 is turned on. When it is determined that the user does not exist, the controller 100 may turn off the display apparatus 100 and change the relative position of the camera 112 from the second position to the first position.

Alternatively, in the first mode, on/off of the display apparatus 100 may be controlled by the user's gesture. For example, when it is determined that the user is present while the display apparatus 100 is turned off, and the relative position of the camera 112 changes from the first position to the second position, the controller 120 may recognize the user's gesture based on the second image captured by the camera 112 in the second position, and turn on the display apparatus 100 when the user's gesture corresponds to a predetermined gesture. Here, the predetermined gesture may be a gesture mapped to an operation of turning on the display apparatus 100.

In the second mode, the camera 112 may be located at the third position or the power of the camera 112 may be turned off so that the external image of the display apparatus 100 may not be captured.

When the user places importance on privacy protection and does not want to use camera-related functions, the second mode may be selected. When the user wants to efficiently use the camera-related functions, the first mode may be selected.

In addition, it is possible to include a third mode in which the camera 112 is always located in the second position to capture the high-resolution image in a mode related to the exposure degree of the camera 112. When the user needs to use camera-related functions more than privacy protection, the third mode may be selected.

In addition, in a mode related to the exposure degree of the camera 112, the camera 112 is always located in the first position to capture the low-resolution image, and the controller 120 may include a fourth mode that detects only the presence of the user and use the result only for on/off control of the display apparatus 100.

In this way, by allowing the user to select one of various modes related to the exposure degree of the camera 112, it is possible to use the camera 112 to protect privacy according to a user's preference.

Figure 17:
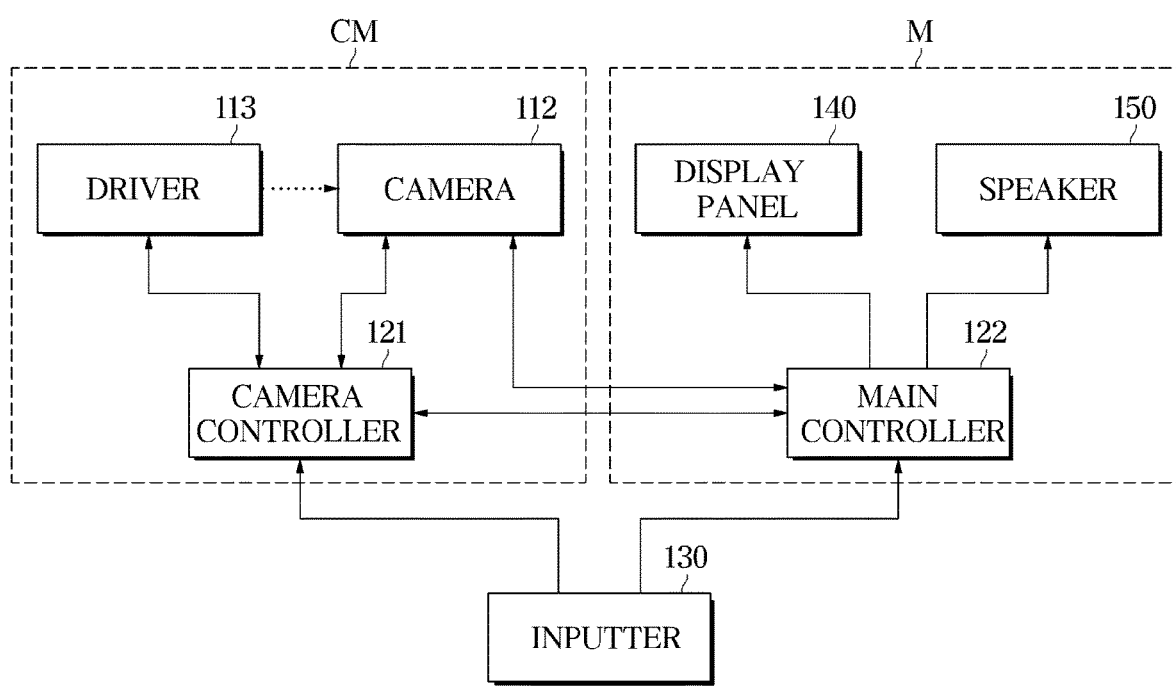
FIGS. 17 and 18 are control block diagrams illustrating a case in which a controller for controlling a camera and a controller for performing image processing to be displayed on a display panel are separately provided in a display apparatus according to an embodiment.
Figure 18:
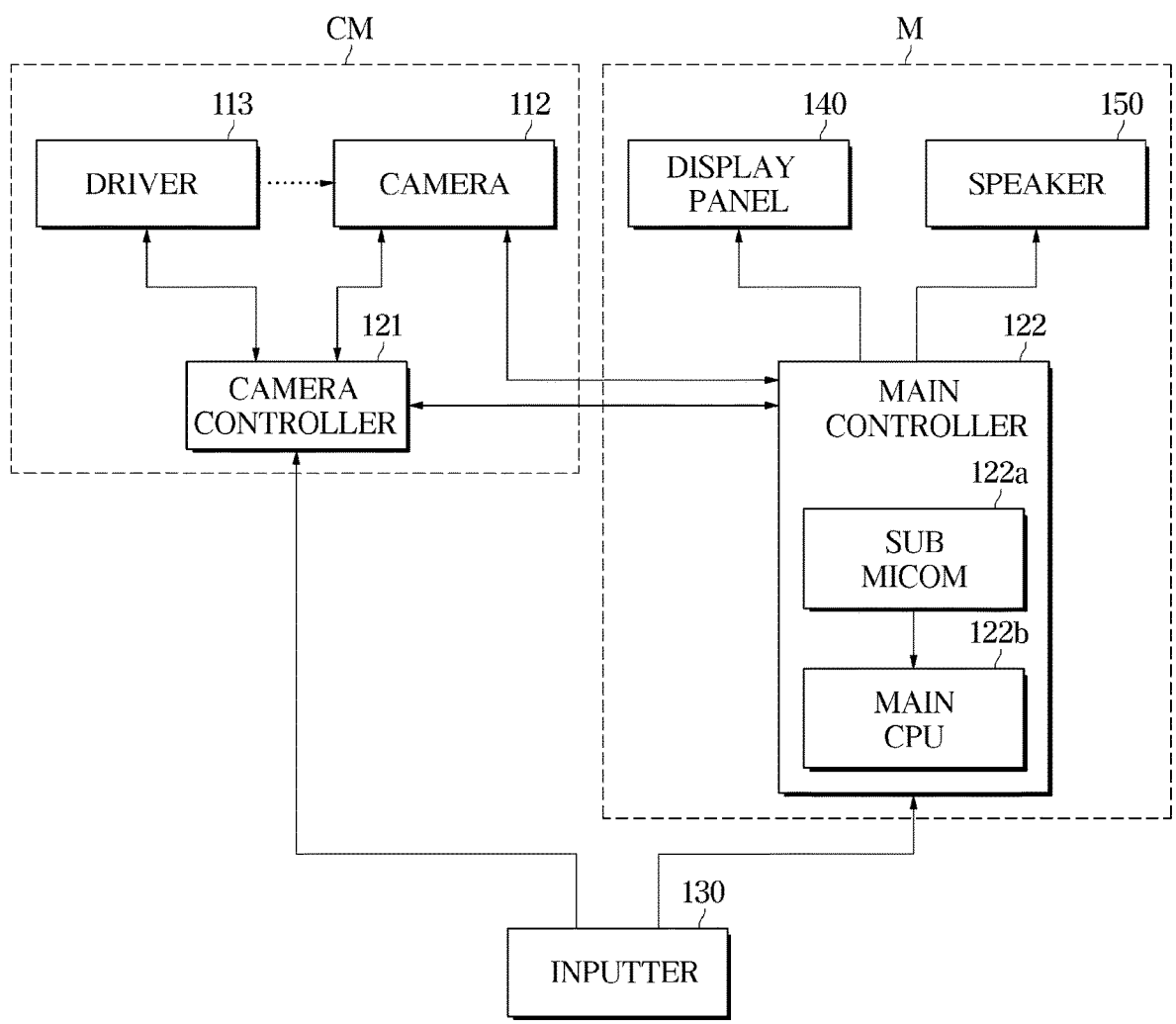

FIGS. 17 and 18 are control block diagrams illustrating a case in which a controller for controlling a camera and a controller for performing image processing to be displayed on a display panel are separately provided in a display apparatus according to an embodiment.

Referring to FIG. 17, the controller 120 of the display apparatus 100 may include a camera controller 121 that controls operations related to the camera 112 and a main controller 122 that controls the overall operation of the display apparatus 100.

The camera controller 121 may control the driver 113 to adjust the relative position of the camera 112 described above, may analyze of the first image to determine the presence of the user, and may control the on/off control of the camera 112. The main controller 122 may control a display panel 140 outputting the image and a speaker 150 outputting sound.

Here, controlling the display panel 140 may include processing the image to be displayed on the display panel 140, and it is not necessary to directly transmit a signal to the display panel 140. For example, when the display panel 140 is a liquid crystal display (LCD) panel, the main controller 122 may process a source signal to generate a control signal for displaying image data and image data on the display panel 140, and may transmit the image data and the control signal to a timing controller. The timing controller may convert the image data and the control signal into a form that can be processed by a source driving circuit and a gate driving circuit that drive the display panel 140 and transmit it. In addition, it is possible to include the timing controller in the main controller 122.

An operation of determining whether the user exists based on the second image may be performed by the camera controller 121 or the main controller 122.

The camera controller 121 may be used to process the first image that is the low-resolution image, and the main controller 122 may be used to process the second image that is the high-resolution image to perform various camera-related functions. Accordingly, the camera controller 121 may use a memory and a processor having a relatively lower capacity and performance compared to the main controller 122.

The camera 112, the driver 113, and the camera controller 121 may constitute a camera module CM. The main controller 122, the display panel 140, and the speaker 150 may constitute a main body M.

The camera module CM and the main body M may receive power independently of each other, and may be independently turned on/off. Therefore, in a state in which the display apparatus 100 is turned off, the power is supplied to the camera module CM even if the power is not supplied to the main body M, so that the camera 112 is turned on, and the driver 113 generates power. The camera controller 121 may control the camera 112 and the driver 113.

When the user does not exist, power consumption of the display apparatus 100 may be reduced by operating only the camera module CM and not operating the main body M. When the camera controller 121 determines that the user exists by applying the image processing algorithm such as the object recognition algorithm to the first image, the camera controller 121 may transmit a wake-up signal to the main controller 122. The main controller 122 receiving the wake-up signal may be turned on to perform processing of the second image and overall control of the display apparatus 100.

Meanwhile, when the display apparatus 100 performs the on/off operation according to the presence or absence of the user, it is possible to go through an on-standby state and an off-standby state without being immediately on/off. The on-standby state and the off-standby state may refer to a state in which the main controller 122 is activated in an operable state, and the display panel 140 is turned off so that the image is not displayed. Turning on the display panel 140 may refer to that a voltage for displaying the image is supplied to the display panel 140 or a backlight light source.

When an additional input from the user is received in the on-standby state, the display apparatus 100 may be turned on. When the predetermined time elapses in the on-standby state, the display apparatus 100 may be turned off.

For example, when the display apparatus 100 is turned off, the camera controller 121 may analyze the first image captured by the camera 112 in the first position to determine the existence of the user. When it is determined that the user exists, the display apparatus 100 may be switched to the on-standby state. In order to switch the display apparatus 100 to the on-standby state, the camera controller 121 may transmit the wake-up signal to the main controller 122, and the main controller 122 receiving the wake-up signal may be activated in the operable state.

However, the main controller 122 may recognize the user's gesture by analyzing the second image without displaying the image on the display panel 140. When the recognized user's gesture corresponds to the predetermined gesture, the main controller 122 may turn on the main body M and control the display panel 140 to display the image. The predetermined gesture may be the gesture mapped to an on operation of the display apparatus 100.

According to the above operation, the presence of the user does not immediately turn on the entire display apparatus 100 to display the image, but to effectively reduce the power of the display apparatus 100 by displaying the image only when an additional input from the user for using the display apparatus 100.

When the display apparatus 100 is turned on, the camera controller 121 or the main controller 122 analyzes the second image captured by the camera 112 in the second position to determine whether the user exists, and the user exists. When it is determined that the user does not exist, the display apparatus 100 may be switched to the off-standby state. The relative position of the camera 112 may be changed from the second position to the first position.

In order to switch the display apparatus 100 to the off-standby state, the main controller 122 may turn off the display panel 140 so as not to display the image.

When the display apparatus 100 is in the off-standby state, when it is determined that the user is present again, the display panel 140 may be turned on again to display the image, and the relative position of the camera 112 may also be changed from the first position to the second position.

When the predetermined time elapses after the display apparatus 100 is switched to the off-standby state, the main controller 122 may also be deactivated and the display apparatus 100 may be turned off.

According to the above-described operation, the display apparatus 100 is not immediately turned off even if the user does not exist, but goes through the off-standby state over time, thereby more faithfully reflecting the user's intention and effectively reducing power consumption.

Referring to FIG. 18, the main controller 122 may include a sub microcomputer 122a and a main central processing unit (CPU) 122b. The camera controller 121 may be implemented as a micro controller unit (MCU) capable of performing simple image processing such as object recognition in the low-resolution image.

As described above, when the camera controller 121 analyzes the first image and determines that the user exists, the wake-up signal may be transmitted to the sub-microcomputer 122a of the main controller 122, and the sub microcomputer 122a may activate the main CPU 113b.

Hereinafter, a method of controlling the display apparatus 100 according to the embodiment will be described. In performing a method of controlling the display apparatus according 100 to the embodiment, the above-described display apparatus 100 may be applied. Accordingly, the contents of the structure and operation of the display apparatus 100 described with reference to FIGS. 1 to 18 may be applied to the embodiment of the method of controlling the display apparatus 100 even if there is no separate mention.

Figure 19:
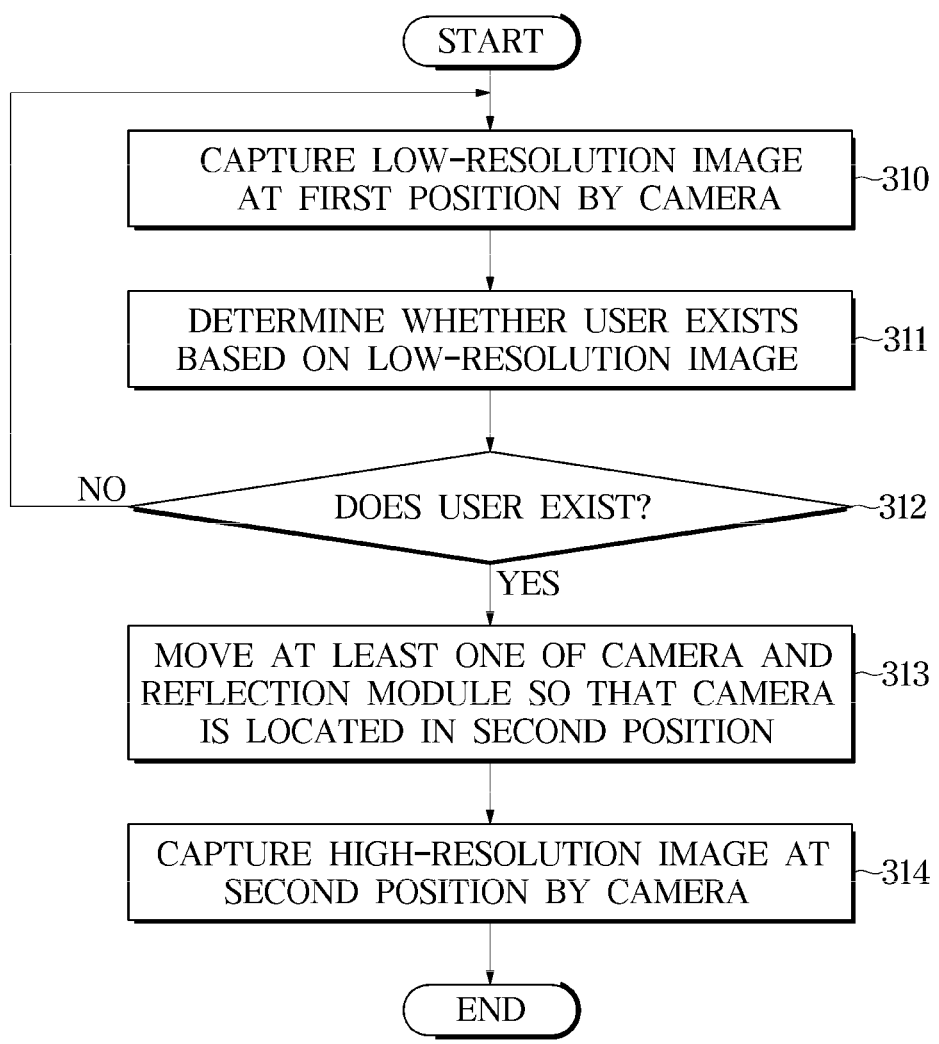
FIG. 19 is a flowchart illustrating a method of controlling a display apparatus according to an embodiment.

FIG. 19 is a flowchart illustrating a method of controlling a display apparatus according to an embodiment.

According to the control method of the display apparatus 100 illustrated in FIG. 19, the camera 112 may capture the low-resolution image in the first position (310), and the controller 120 may determine whether the user exists based on the low-resolution image (311). When it is determined that the user exists (YES in 312), at least one of the camera 112 and the reflection module 111 may be moved so that the camera 112 is located in the second position (313), and the camera 112 may capture the high-resolution image in the second position (314).

In addition, when it is determined that the user is present while the display apparatus 100 is turned off, it is possible to turn on the display apparatus 100. At this time, it is possible to turn on the display apparatus 100 immediately, or to go through the on-standby mode described above.

When the display apparatus 100 is off, only the camera controller 121 is activated to perform low-resolution image analysis, and the main controller 122 corresponding to the main CPU of the display apparatus 100 may be placed in an inactive state to reduce power consume. When it is determined that the user is present, the camera controller 121 may transmit the wake-up signal to the main controller 122 to activate the main controller 122.

As described in the embodiment of the display apparatus 100, the first position and the second position represent the relative positions of the camera 112 with respect to the reflection module 111. In the first position, the camera 112 is located at the rear of the reflection module 111 and generates the first image by using light entering through the reflection module 111.

In the second position, the camera 112 is not located at the rear of the reflection module 111 and generates the image by using light that is exposed to the outside of the display apparatus 100 and directly incident from the front of the display apparatus 100 without passing through the reflection module 111.

The first image may refer to the low-resolution image, and the second image may refer to the high-resolution image.

One of the above-described various structures may be employed in the display apparatus 100. Therefore, in order to change the relative position of the camera 112 from the first position to the second position, the controller 120 may control the camera driver 113a to move only the camera 112, or control both the camera driver 113a and the reflection module driver 113b to move both the camera 112 and the reflection module 111, or control the reflection module driver 113b to move only the reflection module 111.

Figure 20:
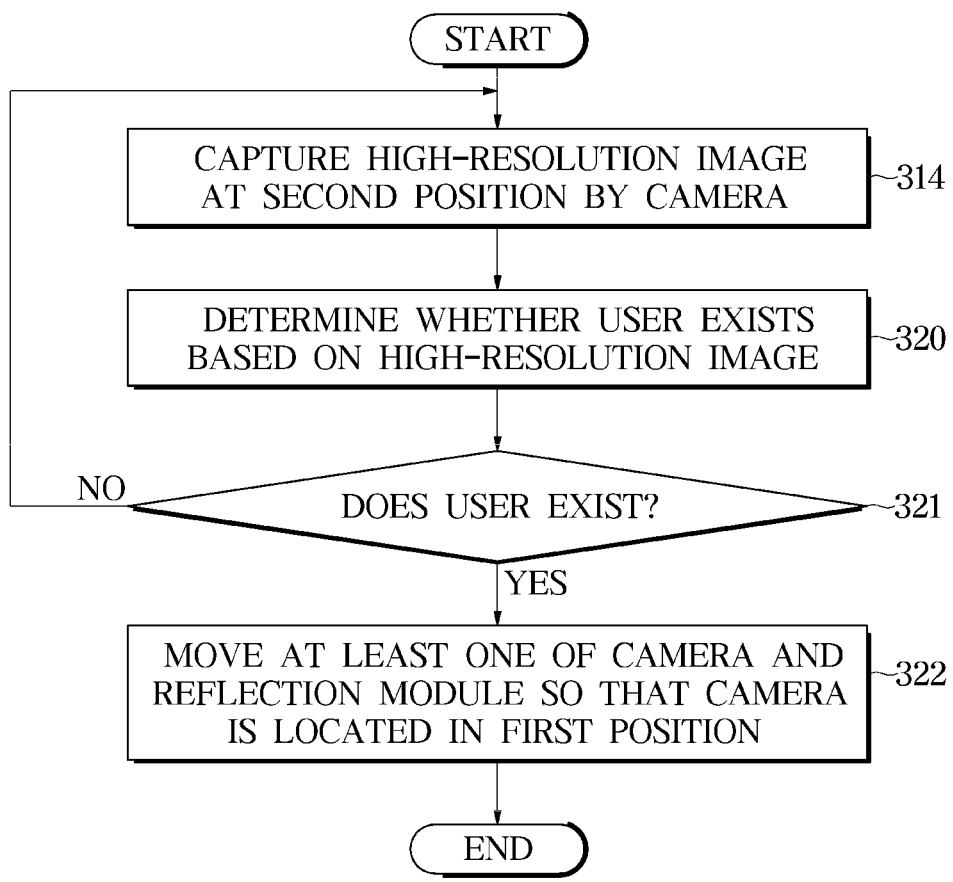
FIG. 20 is a flowchart illustrating an operation after a camera captures a high-resolution image at a second position in a method of controlling a display apparatus according to an embodiment.

FIG. 20 is a flowchart illustrating an operation after a camera captures a high-resolution image at a second position in a method of controlling a display apparatus according to an embodiment.

Referring to FIG. 20, when the camera 112 captures the high-resolution image in the second position (314), the controller 120 may determine whether the user exists based on the high-resolution image (320). Determining whether the user is present based on the high-resolution image may be performed by the camera controller 121 or the main controller 122.

When it is determined that the user does not exist (NO in 321), at least one of the camera 112 and the reflection module 111 may be moved so that the camera 112 is again located in the first position (322).

In addition, when it is determined that the user does not exist while the display apparatus 100 is turned on, it is possible to turn off the display apparatus 100. At this time, it is possible to immediately turn off the display apparatus 100, and it is also possible to go through the off-standby state as described above.

In addition, when the camera 112 captures the high-resolution image, various camera-related functions may be performed. For example, by performing the gesture recognition, the user recognition, the facial expression recognition, etc. based on the high-resolution image, functions such as channel change, volume adjustment, on/off, screen adjustment, etc. corresponding to the recognized gesture may be performed.

Also, the video call may be performed using the high-resolution image captured by the camera 112, and there is no restriction on the types of functions that can be performed using the high-resolution image.

Figure 21:
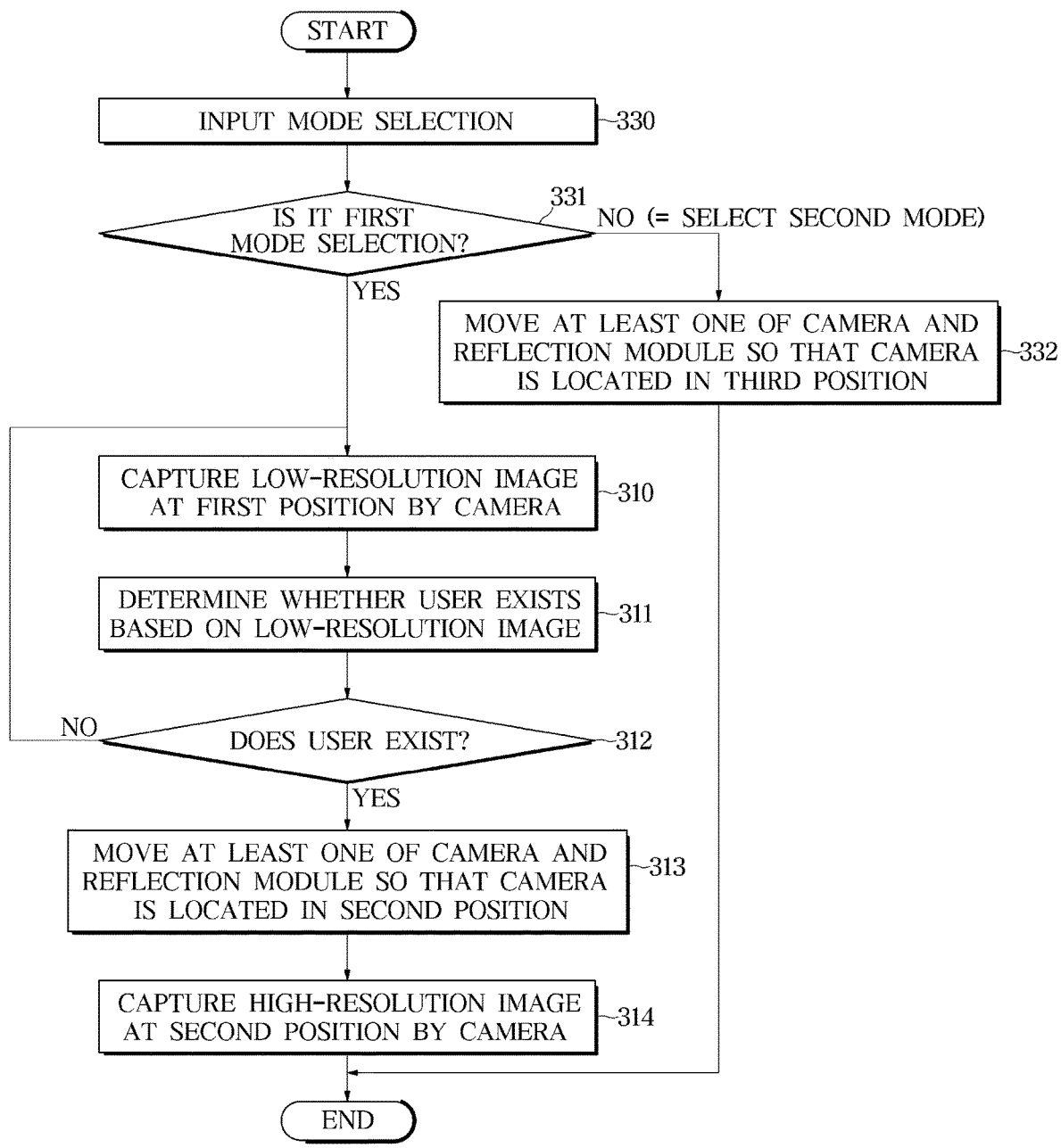
FIG. 21 is a flowchart illustrating a case of receiving a mode selection from a user in a method of controlling a display apparatus according to an embodiment.

FIG. 21 is a flowchart illustrating a case of receiving a mode selection from a user in a method of controlling a display apparatus according to an embodiment.

According to the control method of the display apparatus 100 according to the embodiment, the user may select a mode related to the exposure degree of the camera 112. The mode related to the exposure degree of the camera 112 may include the first mode and the second mode. The first mode is a mode in which the camera 112 captures the low-resolution image in the first position when the user does not exist, and the camera 112 captures the high-resolution image in the second position when the user is present. The second mode is a mode in which the camera 112 cannot capture the external image.

Referring to FIG. 21, when the user's mode selection is input through the inputter 130 provided in the display apparatus 100 (330), and the first mode is selected (YES in 331), the operation 310 of the camera 112 capturing the low-resolution image to the operation 314 of the camera 112 capturing the high-resolution image when the user is present, as described above in FIG. 19.

When the second mode other than the first mode is selected (NO in 331), at least one of the camera 112 and the reflection module 111 may be moved so that the camera 112 is located at the third position (332). Since the camera 112 in the third position is located inside the display apparatus 100 and is not located at the rear of the reflection module 111, the external images cannot be captured. Accordingly, in the second mode, the privacy of the user may be protected.

In FIG. 21, an example in which the external image cannot be captured due to the position of the camera 112 is exemplified, but it is of course possible to turn off the power of the camera 112 so that the external image cannot be captured.

According to the display apparatus and the method of controlling the display apparatus according to the embodiments, when the user does not exist, the image is captured at a state in which the camera is located at the rear of the reflection module and the presence of a user is detected, and the image is captured with the camera exposed to the outside when the user exists, so that the low-resolution image and the high-resolution image may be captured using a single camera and appropriately used for user detection and camera-related functions.

According to the display apparatus and the method of controlling the display apparatus according to the embodiments, privacy may be protected according to user preferences by allowing the user to select the degree to which the camera is exposed.

Embodiments of the disclosure have been described with reference to the accompanying drawings. It should be obvious to a person of ordinary skill in the art that the disclosure may be practiced in other forms by modifying and substituting some or all of the components of the embodiments as described above without changing the technical idea or essential features of the disclosure. The above embodiments are only by way of example, and should not be interpreted as a limitation to the embodiments.

What is claimed is:

1. A display apparatus comprising:
a reflection module having two reflectors facing each other;
a camera configured to capture a first image while the camera is in a first position located at a rear of the reflection module and capture a second image while the camera is located in a second position away from the rear of the reflection module exposed to an outside of the display apparatus;
a driver configured to move at least one of the camera and the reflection module;
a controller configured to:
determine whether there is a presence of a user based on the first image captured by the camera in the first position, and
control the driver to move at least one of the camera and the reflection module so that the camera is located in the second position, based on the presence of the user being determined; and
an inputter configured to receive a user input,
wherein the two reflectors facing each other are configured to guide light to the camera in the first position located at the rear of the reflection module so that the camera in the first position captures the first image,
wherein:
the first image comprises a low-resolution image; and
the second image comprises a high-resolution image.

2. The display apparatus according to claim 1, wherein:
the driver comprises a camera driver configured to move the camera; and
the controller is configured to control the camera driver to move the camera along a vertical direction so that the camera is located in the first position or the second position.

3. The display apparatus according to claim 1, wherein:
the driver comprises a camera driver configured to move the camera and a reflection module driver configured to move the reflection module; and
the controller is configured to control the camera driver and the reflection module driver to move the camera along a vertical direction or the reflection module along the vertical direction so that the camera is located in the first position or the second position.

4. The display apparatus according to claim 1, wherein:
the driver comprises a reflection module driver configured to move the reflection module; and
the controller is configured to control the reflection module driver to move the reflection module along a vertical direction so that the camera is located in the first position or the second position.

5. The display apparatus according to claim 1, wherein the controller is configured to control the driver to move the at least one of the camera and the reflection module so that the camera is located at a third position where an external image cannot be captured.

6. The display apparatus according to claim 1, wherein the controller is configured to turn off a power of the camera so that the camera located in the first position or the second position cannot capture an external image.

7. The display apparatus according to claim 1, wherein the controller is configured to turn on the display apparatus based on the presence of the user being determined, and to turn off the display apparatus based on no presence of the user being determined.

8. The display apparatus according to claim 1, wherein:
the controller is configured to control the driver according to a first mode, based on the inputter receiving a selection of the first mode from the user; and in the first mode, the camera is configured to capture the first image while the camera is in the first position in response to no presence of the user being determined, and to capture the second image while the camera is in the second position in response to the presence of the user being determined.

9. The display apparatus according to claim 8, wherein:
the controller is configured to control the driver according to a second mode, based on the inputter receiving a selection of the second mode from the user; and
in the second mode, the camera is configured to not capture an external image.

10. The display apparatus according to claim 8, wherein:
the controller is configured to control the driver according to a third mode, based on the inputter receiving a selection of the third mode from the user; and
in the third mode, the camera is configured to capture the second image while the camera is at the second position in response to the presence of the user being determined and no presence of the user being determined.

11. The display apparatus according to claim 8, wherein:
the controller is configured to control the driver according to a fourth mode, based on the inputter receiving a selection of the fourth mode from the user; and
in the fourth mode, the camera is configured to capture the first image while the camera is at the first position in response to the presence of the user being determined and no presence of the user being determined.

12. The display apparatus according to claim 1, wherein:
the controller comprises a camera controller and a main controller; and
the camera controller is configured to wake up the main controller in response to the presence of the user being determined based on the first image.

13. The display apparatus according to claim 12, wherein the main controller is configured to:
switch the display apparatus to an off-standby state based on no presence of the user being determined in response to the display apparatus being turned on; and
be activated in the off-standby state and not display an image on a display panel.

14. The display apparatus according to claim 13, wherein the main controller is configured to be deactivated and turn off the display apparatus in response to a lapse of a predetermined time after switching to the off-standby state.

15. The display apparatus according to claim 12, wherein the main controller is configured to:
switch the display apparatus to an on-standby state based on the presence of the user being determined in response to the display apparatus being turned off; and
be activated in the on-standby state and not display an image on a display panel.

16. The display apparatus according to claim 15, wherein the main controller is configured to turn on the display apparatus in response to receiving a predetermined user input after switching to the on-standby state.

17. The display apparatus according to claim 1, wherein:
at least one of the two reflectors has a convex shape.

18. A method of controlling a display apparatus comprising:
capturing, by a camera, a low-resolution image while the camera is in a first position located at a rear of a reflection module;
determining, by a controller, whether a user is present based on the low-resolution image;
in response to determining that the user is present, moving, by the controller, at least one of the camera and the reflection module so that the camera is located in a second position away from the rear of the reflection module exposed to an outside; and
capturing, by the camera, a high-resolution image while the camera is in the second position,
wherein:
the reflection module comprises two reflectors facing each other; and
the two reflectors facing each other are configured to guide light to the camera in the first position located at the rear of the reflection module so that the camera in the first position captures the first image.

19. The method according to claim 18, further comprising:
determining, by the controller, whether the user is present based on the high-resolution image captured by the camera in the second position; and
in response to determining that the user is not present, moving, by the controller, at least one of the camera and the reflection module so that the camera is located in the first position.

* * * * *